United States Patent
Sarosh

(10) Patent No.: US 11,790,321 B2
(45) Date of Patent: *Oct. 17, 2023

(54) SYSTEMS AND METHODS FOR CROWDSOURCING TECHNOLOGY PROJECTS

(71) Applicant: CrowdPlat, Inc., San Jose, CA (US)

(72) Inventor: Sahil Sarosh, San Jose, CA (US)

(73) Assignee: CrowdPlat, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,396

(22) Filed: Sep. 10, 2021

(65) Prior Publication Data

US 2021/0406834 A1 Dec. 30, 2021

Related U.S. Application Data

(60) Continuation of application No. 16/442,966, filed on Jun. 17, 2019, now Pat. No. 11,120,402, which is a
(Continued)

(51) Int. Cl.
*G06Q 10/10* (2023.01)
*H04L 51/04* (2022.01)

(52) U.S. Cl.
CPC .......... *G06Q 10/103* (2013.01); *H04L 51/04* (2013.01)

(58) Field of Classification Search
None
See application file for complete search history.

(56) References Cited

U.S. PATENT DOCUMENTS 7,039,606 B2 * 5/2006 Hoffman .............. G06Q 50/188
705/28
7,072,843 B2 * 7/2006 Menninger .......... G06Q 20/203
705/16
(Continued)

FOREIGN PATENT DOCUMENTS

JP 2002092371 A 3/2002
JP 2004086757 A 3/2004
(Continued)

OTHER PUBLICATIONS

Anonymous Anonymous: "Mean Stack: Stack: Step a free EC2 Server | Mediterranean Flavour of IT",—Sep. 17, 2013 pp. 1-9.
(Continued)

*Primary Examiner* — Fateh M Obaid
(74) *Attorney, Agent, or Firm* — Perkins Coie LLP

(57) ABSTRACT

The technology introduced here enables a customer to readily view, and securely connect with, project managers and freelancers who complete projects on behalf of the customer. The customer initially posts a project specification through a crowdsourcing platform. Project managers compete with one another by submitting proposals for the project through a freelancing platform. When a proposal is selected by the customer, the project manager corresponding to the proposal can construct a team that includes one or more freelancers who complete the technology project under the supervision of the project manager. As milestones are completed, the project manager and/or freelancer(s) can be paid from an escrow account maintained by the administrator. Additionally or alternatively, invoices for work completed by the team could be generated and delivered to the customer.

22 Claims, 40 Drawing Sheets

Related U.S. Application Data division of application No. 15/002,134, filed on Jan. 20, 2016, now Pat. No. 10,373,120.

(60) Provisional application No. 62/106,131, filed on Jan. 21, 2015.

(56) References Cited

U.S. PATENT DOCUMENTS

| | | | |
|---|---|---|---|
| 7,120,596 B2 * | 10/2006 | Hoffman | G06Q 40/12 705/28 |
| 7,171,379 B2 * | 1/2007 | Menninger | G06Q 10/06 705/28 |
| 7,546,246 B1 * | 6/2009 | Stamm | G06Q 10/06 705/7.37 |
| 9,237,170 B2 | 1/2016 | Kiang et al. | |
| 10,621,498 B1 * | 4/2020 | Tegtmeyer | G06Q 10/06 |
| 2001/0051913 A1 | 12/2001 | Vashistha et al. | |
| 2006/0015416 A1 * | 1/2006 | Hoffman | G06Q 50/188 705/28 |
| 2006/0229896 A1 * | 10/2006 | Rosen | G06Q 10/1053 705/321 |
| 2012/0185235 A1 * | 7/2012 | Albat | G06F 40/58 704/2 |
| 2013/0066961 A1 | 3/2013 | Naik et al. | |
| 2013/0179226 A1 | 7/2013 | Adams et al. | |
| 2013/0197954 A1 | 8/2013 | Yankelevich et al. | |
| 2013/0332213 A1 | 12/2013 | Heggen | |
| 2014/0026181 A1 | 1/2014 | Kiang et al. | |
| 2014/0108269 A1 * | 4/2014 | Meijler | G06Q 10/103 705/301 |
| 2014/0156331 A1 | 6/2014 | Cordasco | |
| 2014/0188787 A1 * | 7/2014 | Balamurugan | G06Q 30/0629 707/609 |
| 2014/0214607 A1 | 7/2014 | Kazai et al. | |
| 2014/0304833 A1 | 10/2014 | Gujar et al. | |
| 2015/0206246 A1 | 7/2015 | Lange et al. | |
| 2016/0210592 A1 | 7/2016 | Sarosh | |
| 2017/0308811 A1 | 10/2017 | Kumar | |
| 2018/0114177 A1 | 4/2018 | Somech et al. | |
| 2019/0303872 A1 | 10/2019 | Sarosh | |

FOREIGN PATENT DOCUMENTS

| | | |
|---|---|---|
| JP | 2004234427 A | 8/2004 |
| JP | 2005174064 A | 6/2005 |

OTHER PUBLICATIONS

Australian Examination Report dated Nov. 11, 2020 of Australian Patent Application No. 2016209338 (5 pages).
Final Office Action dated Jan. 4, 2021 of U.S. Appl. No. 16/442,966 by Sahil Sarosh, filed Jun. 17, 2019.
Final Office Action dated Nov. 16, 208 of U.S. Appl. No. 15/002,134 by Sahil Sarosh, filed Jan. 20, 2016.
First Examination dated Apr. 12, 2021 of Indian Patent Application No. 201747025966 (8 pages).
International Search Report and Written Opinion dated Apr. 1, 2016, for International Application No. PCT/US2016/14172, 10 pages.
Non-Final Office Action dated Apr. 19, 2018 by Sahil Sarosh of U.S. Appl. No. 15/002,134, filed Jan. 20, 2016.
Non-Final Office Action dated Jun. 1, 2020 of U.S. Appl. No. 16/442,966 by Sahil Sarosh, filed Jun. 17, 2019.
Notice of Allowability dated May 28, 2021 of U.S. Appl. No. 15/002,134 by Sahil Sarosh, filed Jan. 20, 2016.
Notice of Allowance dated May 21, 2021 of U.S. Appl. No. 16/442,966, filed Jun. 17, 2019.
Notice of Allowance dated Apr. 4, 2019 of U.S. Appl. No. 15/002,134 by Sahil Sarosh, filed Jan. 20, 2016.
Notification of Reasons for Refusal dated Sep. 13, 2019 of Japanese Patent Application No. 2017-539365, 15 pages.
Restriction Requirement dated Jan. 10, 2020 of U.S. Appl. No. 16/442,966 by Sahil Sarosh, filed Jun. 17, 2019.
Restriction Requirement dated Jan. 25, 2018 of U.S. Appl. No. 15/002,134 by Sahil Sarosh, filed Jan. 20, 2016.
Supplementary European Search Report of EP 16740698 dated May 18, 2018, 2 pages.
U.S. Appl. No. 15/002,134 by Sahil Sarosh, filed Jan. 20, 2016.
U.S. Appl. No. 16/442,966 by Sahil Sarosh, filed Jun. 17, 2019.

* cited by examiner

FIG. 5A

Customer Sign Up
- First Name
- Last Name
- Work Email
- Password
- Sign Up

FIG. 5B

Post Project
- Project Title
- Project Description
- Estimated Time in Weeks
- Estimated Project Budget
- Expected Start Date
- Budget Status
- File Attachments:
- Upload Files
- Save
- Cancel
- Submit

Profile Page

- First Name
- Last Name
- Email
- Phone Number
- Job Title
- Company Name
- Company Industry
- Company Size
- Country Save

FIG. 5C

Change Password

- Old Password
- New Password
- New Password

Change Password

Account Settings

- Email Notification ☒
- Mobile Notification ☒

Save Settings

FIG. 5D

Login

- Email
- Password

Sign In (Forgot your password)

Forgot Password

- Email Address

Send Instructions

FIG. 5E

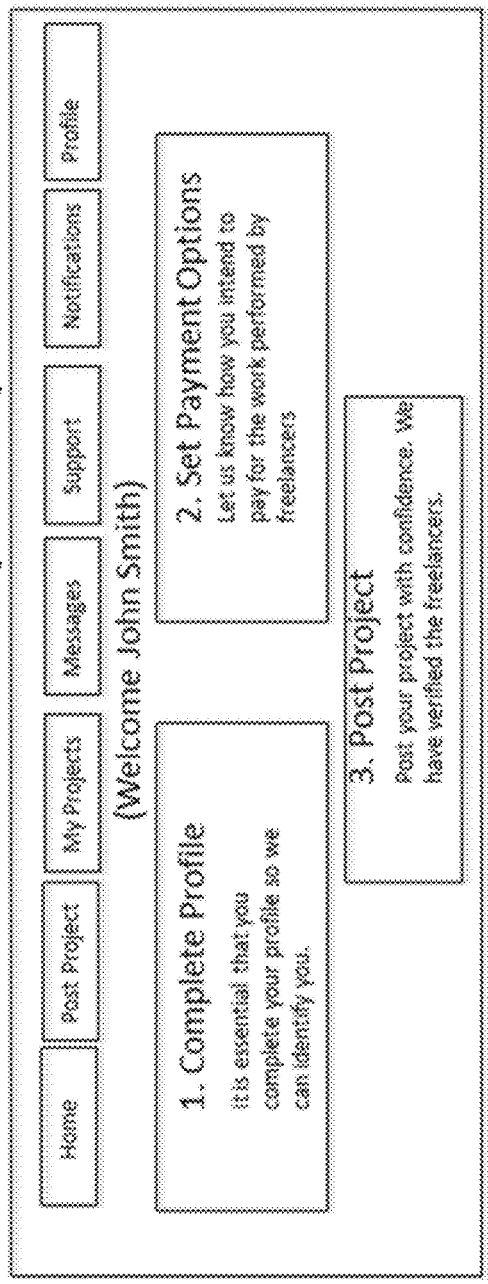
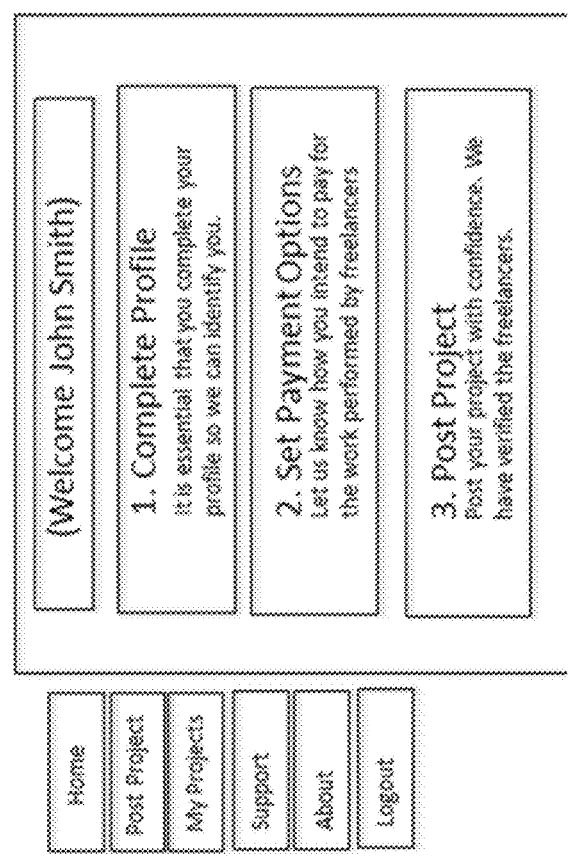
FIG. 5G

FIG. 5I

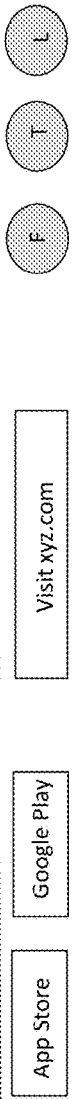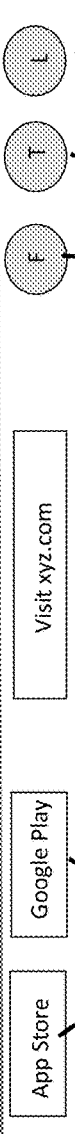
FIG. 5N

Profile Page

- First Name
- Last Name
- Email
- Phone Number
- Geographies Worked (Multiple)
- Languages Spoken (Multiple)
- Size of Company worked (Multiple)
- Industries Worked (Multiple)
- Role ▶
- Skills (Multiple)
- LinkedIn (attach)
- Country ▶

Save

Change Password Page

- Old Password
- New Password
- New Password

Change Password

Login

- Email
- Password

Sign In (Forgot your password)

Account Settings

- Email Notification  X
- Mobile Notification  X

Save Settings

Forgot Password

- Email Address

Send Instructions

Web

Freelance PM Dashboard (New User)

| Home | Post Project | My Projects | Messages | Support | Notifications | Profile |

(Welcome John Smith)

1. Complete Profile
It is essential that you complete your profile so we can identify you.

2. Sign Agreement
Please complete the agreement page

3. Attach (or Email) Documents
Attach legal documents so we can verify you

Mobile

(Welcome John Smith)

1. Complete Profile
It is essential that you complete your profile so we can identify you.

2. Sign Agreement
Please complete the agreement page.

3. Attach (or Email) Documents
Attach legal documents so we can verify you

| Home | Post Project | My Projects | Support | About | Logout |

FIG. 6F

Web

Project List

| Project Name | Status | PM Name | Search |
|---|---|---|---|

| Title | Description | Status |
|---|---|---|
| Build mobile App | Create a mobile game app with... | Submitted |
| Platform migration | Migrate the platform from AWS to... | Not Submitted |
| Soln. Provisioning | Provision customer soln. | Submitted |

Mobile

| Status | PM Name | Search |
|---|---|---|
| Project Name | | |

| Title | Description | |
|---|---|---|
| Build mobile app | Create a mobile game app with... | > |
| Platform migration | Migrate the platform from AWS to... | > |

FIG. 6G

Project Details – Overview Page

Web

| Overview | Discussion | Proposal | Team | Status |

- Project Title
- Project Description
- Estimated Time in Weeks
- Estimated Project Budget
- Expected Start Date
- Estimated Project Budget
- Budget Status
- File Attachments:
  File-1.doc
  File-2.pdf Mobile

- Project Title
- Project Description
- Estimated Time in Weeks
- Estimated Project Budget
- Expected Start Date
- Estimated Project Budget
- Budget Status
- File Attachments: File-1.doc, File-2.pdf

| Overview | Discussion | Proposal | Team | Status |

FIG. 6H

Project Details – Proposal Page

Web

| Overview | Discussion | Proposal | Team | Status |

Proposal Summary

[text box]

File Attachments:

[Upload Files] [Submit]

| # | Milestone | Cost |
|---|---|---|
| 1 | Design | $5000 |
| 2 | Development | $8000 |
| 3 | Testing | $2000 |

[Add Milestone]

[Submit Proposal]

Mobile

Proposal Summary

[text box]

File Attachments:

[Upload Files] [Submit]

| # | Milestone | Cost |
|---|---|---|
| 1 | Design | $5000 |
| 2 | Development | $8000 |

| Overview | Discussion | Proposal | Team | Status |

FIG. 6J

Email Notifications – Freelance PM

Dear Jack (Freelance PM),

Customer has awarded the project to you. Please review the project details and start assembling the team.

Please confirm the team once you are done.

[ F ] [ T ] [ L ]

| App Store | Google Play | Visit abc.com |

Dear Jack (Freelance PM),

You have received a 1:1 message from Sue.

Please click here to open the message.

[ F ] [ T ] [ L ] → Link to social pages

| App Store | Google Play | Visit abc.com |

Link to app store or google play

FIG. 6M

Login

Email

Password

Sign In (Forgot your password)

Forgot Password

Email Address

Send Instructions

Change Password Page

Old Password

New Password

New Password

Change Password

Account Settings

Email Notification  X

Mobile Notification  X

Save Settings

Profile Page

First Name

Last Name

Email

Phone Number

Geographies Worked (Multiple)

Languages Spoken (Multiple)

Size of Company worked (Multiple)

Industries Worked (Multiple)

Role

Skills (Multiple)

LinkedIn (attach)

Country

Save

Web

Freelancer Dashboard (New User)

Home | Post Project | My Projects | Messages | Support | Notifications | Profile (Welcome Sandeep Vel)

1. Complete Profile
It is essential that you complete your profile so we can identify you.

2. Sign Agreement
Please complete the agreement page

3. Attach (or Email) Documents
Attach legal documents so we can verify you

Mobile

(Welcome Adam John)

1. Complete Profile
It is essential that you complete your profile so we can identify you.

2. Sign Agreement
Please complete the agreement page.

3. Attach (or Email) Documents
Attach legal documents so we can verify you

Home | Post Project | My Projects | Support | About | Logout

FIG. 7F

Project List

Web

| Project Name ▸ | Status ▸ | PM Name ▸ | Search |

Title | Status
Mobile App | Submitted
Platform migration | Not Submitted
Soln. Provisioning | Submitted Mobile Status ▸ | PM Name ▸
Project Name | Search Title
Mobile app | Submitted ⌄
Platform migration | Not Submitted ⌄

FIG. 7G

Project Details – Proposal Page

Web

| Overview | Discussion | Proposal | Team | Status |

Proposals submitted by:

Jack Walsh        Project Awarded

Sue Clifton

Tim McCarthy

Mobile

Proposals were submitted by:

Jack Walsh        Project Awarded

Sue Clifton

Tim McCarthy

| Overview | Discussion | Proposal | Team | Status |

FIG. 7J

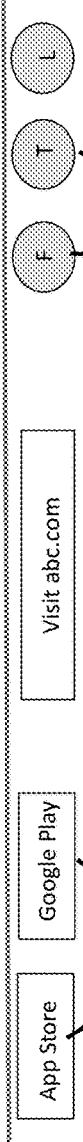
FIG. 7M

SYSTEMS AND METHODS FOR CROWDSOURCING TECHNOLOGY PROJECTS

CROSS REFERENCE TO RELATED APPLICATION

This application is a continuation of U.S. application Ser. No. 16/442,966 filed on Jun. 17, 2019, which is a divisional of U.S. application Ser. No. 15/002,134 filed on Jan. 20, 2016, now U.S. Pat. No. 10,373,120 issued on Aug. 6, 2019, which claims the benefit of U.S. Provisional Application Ser. No. 62/106,131 filed on Jan. 21, 2015. The aforementioned applications are incorporated herein by reference in their entirety.

FIELD OF THE INVENTION

At least one embodiment of the present disclosure pertains to systems and techniques for crowdsourcing a technology project, and more particularly, for connecting a customer or a partner's customer with freelance project managers who compete for the technology project posted by the customer.

BACKGROUND

Companies have traditionally outsourced work associated with certain technology projects to third-party consulting firms to reduce costs and obtain expertise in a given area (e.g., software programming). Many of these companies (or the third-party consultant used by those companies) have been leveraging offshore resources in countries such as India, Russia, and China, to further reduce costs. Historically, these offshore resources have been hired directly by the business entity/third-party consultant or have been sourced through sub-contracting firms, consulting partners, or as independent contractors.

Freelancing is a relatively new trend that allows companies to source freelance talent from around the world for all types of work. Websites that facilitate freelancing have become popular for identifying and managing freelance talent for a wide variety of tasks. However, while startup companies ("startups") and small businesses are increasingly using such websites to source talent (i.e., identify and employ freelancers), mid-size and large companies have refrained from using these websites to a great extent. These larger entities instead continue to hire in-house staff to handle the sourcing of talent or outsource the work to third-party consulting firms.

There are several reasons for this, such as the lack of verification of project managers or of freelancers, the need for a team of freelancers, and the lack of ownership and accountability for delivery. Consequently, most (if not all) freelancing-related websites target startups and smaller companies because the above issues are not as important to these entities.

BRIEF DESCRIPTION OF THE DRAWINGS

One or more embodiments of the present invention are illustrated by way of example and not limitation in the figures of the accompanying drawings, in which like references indicate similar elements.

FIG. 5A shows an example of a graphical user interface (GUI) that is viewable through the crowdsourcing platform and with which a customer can interact.

FIG. 5B shows an example of a GUI that is viewable through the crowdsourcing platform and with which a customer can interact.

FIG. 5C shows an example of a GUI that is viewable through the crowdsourcing platform and with which a customer can interact.

FIG. 5D shows an example of a GUI that is viewable through the crowdsourcing platform and with which a customer can interact.

FIG. 5E shows an example of a GUI that is viewable through the crowdsourcing platform and with which a customer can interact.

FIG. 5G shows an example of a GUI that is viewable through the crowdsourcing platform and with which a customer can interact.

FIG. 5I shows an example of a GUI that is viewable through the crowdsourcing platform and with which a customer can interact.

FIG. 5N shows an example of a GUI that is viewable through the crowdsourcing platform and with which a customer can interact.

FIG. 6C shows an example of a GUI that is viewable through the freelancing platform and with which a project manager can interact.

FIG. 6D shows an example of a GUI that is viewable through the freelancing platform and with which a project manager can interact.

FIG. 6F shows an example of a GUI that is viewable through the freelancing platform and with which a project manager can interact.

FIG. 6G shows an example of a GUI that is viewable through the freelancing platform and with which a project manager can interact.

FIG. 6H shows an example of a GUI that is viewable through the freelancing platform and with which a project manager can interact.

FIG. 6I shows an example of a GUI that is viewable through the freelancing platform and with which a project manager can interact.

FIG. 6J shows an example of a GUI that is viewable through the freelancing platform and with which a project manager can interact.

FIG. 6M shows an example of a GUI that is viewable through the freelancing platform and with which a project manager can interact.

FIG. 7C shows an example of a GUI that is viewable through the freelancing platform and with which a freelancer can interact.

FIG. 7D shows an example of a GUI that is viewable through the freelancing platform and with which a freelancer can interact.

FIG. 7F shows an example of a GUI that is viewable through the freelancing platform and with which a freelancer can interact.

FIG. 7G shows an example of a GUI that is viewable through the freelancing platform and with which a freelancer can interact.

FIG. 7I shows an example of a GUI that is viewable through the freelancing platform and with which a freelancer can interact.

FIG. 7J shows an example of a GUI that is viewable through the freelancing platform and with which a freelancer can interact.

FIG. 7M shows an example of a GUI that is viewable through the freelancing platform and with which a freelancer can interact.

DETAILED DESCRIPTION

Figure 1A:
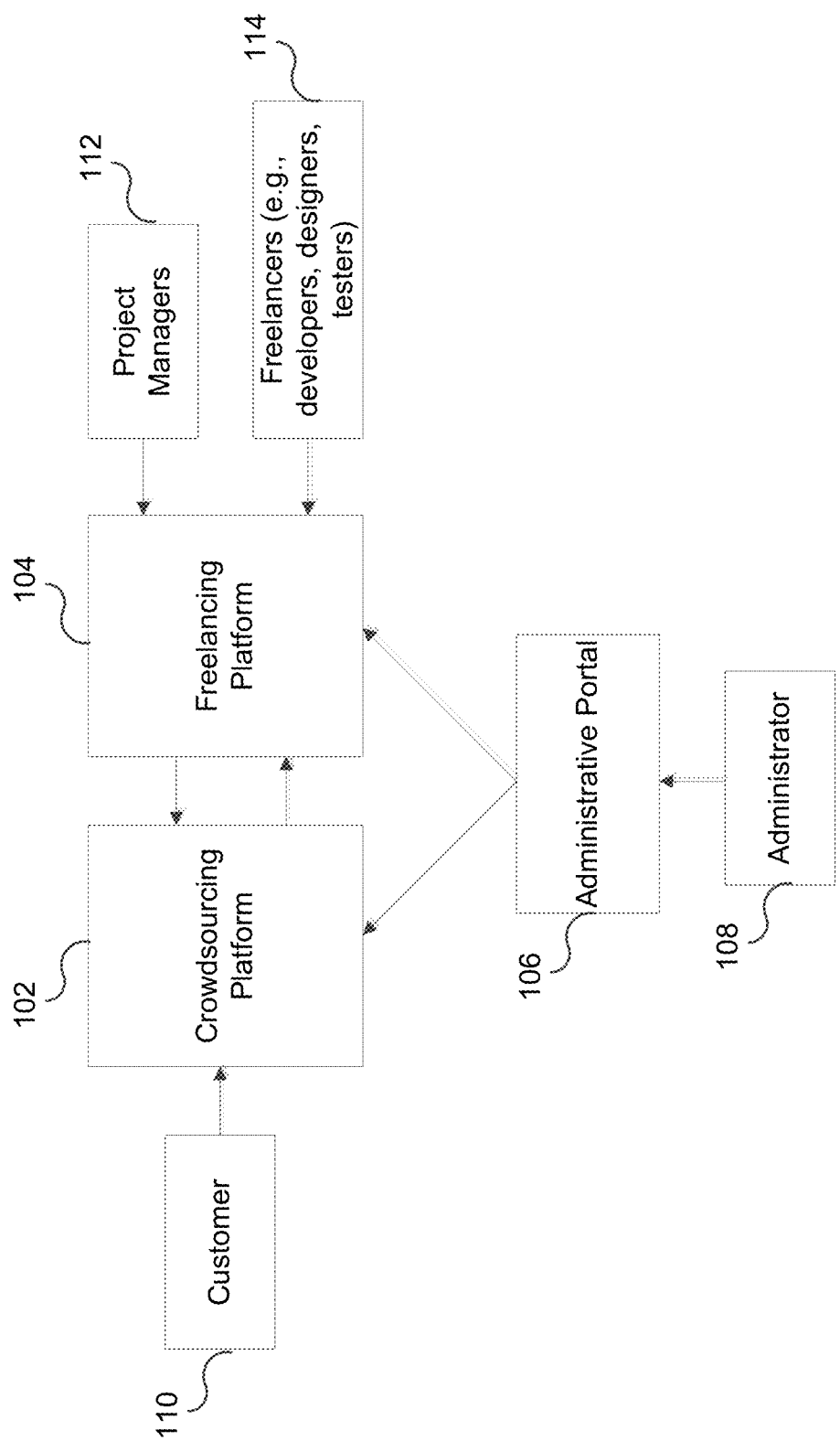
FIG. 1A depicts the relationship between the crowdsourcing platform, the freelancing platform, and the administrative portal.

The technology introduced here includes methods, apparatuses, and systems that enable a representative from a company (also referred to as a "customer") to readily view, and securely connect with, multiple project managers who compete for a technology project posted by the customer. More specifically, the customer is able to select a proposal for completing the technology project from among multiple proposals submitted by different project managers. When a proposal is selected by the customer, the project manager corresponding to the proposal can construct a team that includes one or more freelancers who may work together to complete the technology project under the supervision of the project manager. A "customer" is any business or business representative that has a need for the services of multiple freelancers (e.g., a freelance project manager, also referred to as a "project manager," and at least one other freelance worker, also referred to as a "freelancer"). A "customer" could also be a customer of either an administrator (or an administrative entity) or a partner of the administrator. A partner could be, for example, a consulting firm that would like to use a crowdsourcing platform for its customers. Project managers and freelancers are independent consultants who provide services to customers.

For example, platforms are illustrated and described herein that allow a customer to select a project manager from a pool of project managers who compete with one another for technology projects posted by customers. Generally, each project manager in the pool is verified by an administrator who oversees the crowdsourcing process. Platforms are also described herein that allow project managers to review and access resources (e.g., freelancers and tools, such as proprietary technology and/or third-party technologies) that can be used to complete the project for which the project manager has been selected.

A crowdsourcing platform allows customers of all sizes, from startups to large enterprises, to post details regarding a project. For example, a customer could post a project specification that includes parameters for completing the project, the desired timeline for completion, the expected budget, etc. Via the crowdsourcing platform, the customer is also able to view proposals(s) submitted by project managers, award the project to one of the project managers, and manage execution (e.g., review progress) of the project. The project manager chosen by the customer may also be referred to as the "account manager."

A partner platform may also allow customers of a partner (e.g., a consulting firm) to use the crowdsourcing platform in the same manner as other customers use the crowdsourcing platform. In such embodiments, the partner administrator (e.g., an employee of the partner) can use a partner administrative portal that is configured to have the look and feel of an interface associated with the partner. For example, the partner administrative portal may include the logo, tagline, and/or color scheme of the partner.

A freelancing platform, meanwhile, allows project managers to submit proposals for projects and execute projects (e.g., by selecting freelancers for the team and assigning tasks to those freelancers). For example, project managers, each of whom are verified by an administrator that manages the crowdsourcing and freelancing platforms, can submit proposals to a customer for a posted project specification and, if awarded the project, identify and select freelancers (e.g., developers, designers, testers, etc., who may also be verified by the administrator) required to execute the project. The freelance platform can then be used by the project manager to manage the selected freelancers throughout the lifespan of the project, and to communicate the status of a project to the customer.

Similarly, freelancers can view at least some details of a project specification posted by a customer and express an interest in working on the project. For example, freelancers may only be able to see the title of the project, while additional information may be accessible to project managers. Freelancers may also be able to communicate with the project managers before, during, and after the project managers submit proposals. However, after the project is assigned to a project manager, those freelancer(s) who indicated having an interest in the project (or other freelancers) may be selected by the project manager to form the team that completes the project.

Together, the crowdsourcing and freelancing platforms enable a customer to readily choose between multiple project managers who compete for projects, source a team for a project, and manage completion of the project without outsourcing any work to third-party providers. Various embodiments of the technology introduced here employ the crowdsourcing platform used by customers, the freelancing platform used by freelancers, an administrative portal used by the administrator, a workflow and user interface, an execution model, and other functional details and concepts described throughout the disclosure.

FIG. 1 depicts an example of a two-sided freelancing system that includes a crowdsourcing platform 102 and a freelancing platform 104. In various embodiments, crowdsourcing platform 102 and a freelancing platform 104 are each connected to one or more computer networks, which may include one or more local area networks (LANs), wide-area networks (WAN), metropolitan area networks (MANs), and/or the Internet. Generally, the crowdsourcing platform 102 is responsible for generating interfaces intended for customer use and the freelancing platform 104 is responsible for generating interfaces intended for freelancer use (e.g., project managers 112 and other freelancers 114). An administrator 108 (e.g., a user or processing system) or an associated business entity can manage both platforms through an administrative portal 106 (or directly through either platform).

Figure 1B:
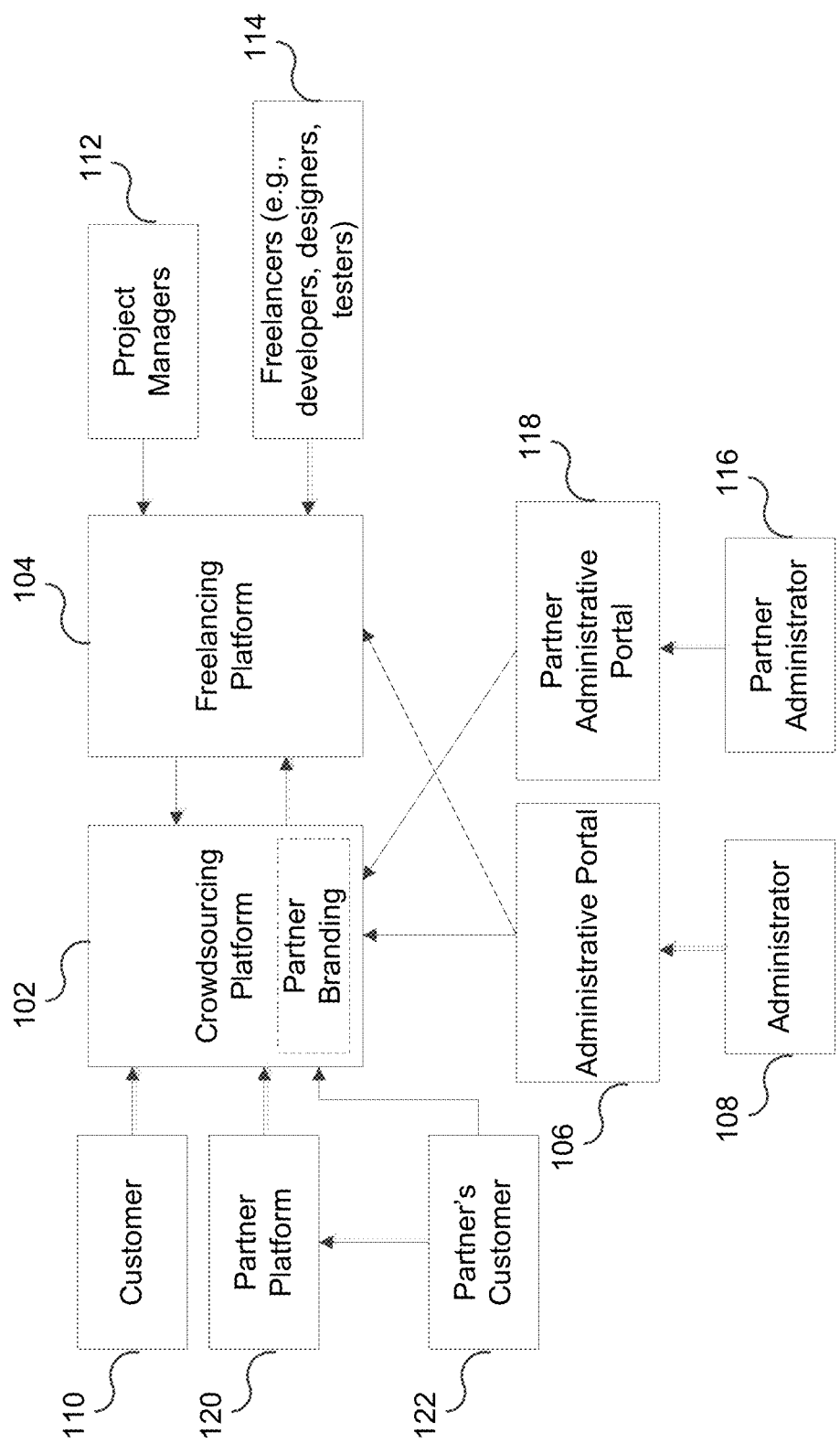
FIG. 1B depicts the relationship between the crowdsourcing platform, the freelancing platform, the partner platform, the administrative portal, and the partner administrative portal.

Similarly, as shown in FIG. 1B, a partner administrator 116 (e.g. an employee of the partner), can use a partner administrative portal 118 to customize the look and feel of a partner platform 120 that is accessible by customers 122 of the partner. The partner platform 120 could be, for example, substantially similar in purpose to the crowdsourcing platform 102, but may be branded for the partner (e.g., with the partner's logo, tagline, or color scheme).

More specifically, the crowdsourcing and freelancing platforms allow project managers 112, who are verified by the administrator 108, to compete for a project submitted by the customer 110. The project is submitted by the customer 110 through the crowdsourcing platform 102, which is viewable by the customer on a network-accessible user device (e.g., mobile phone, tablet, laptop computer, watch). For example, a customer 110 may submit a project specification that includes various details regarding the project.

Project managers 112 can view projects posted by customers 110, communicate with one another and other freelancers 114 regarding posted projects, etc., using the freelancing platform 104. Freelancers 114 can view at least some information about projects posted by customers 110, communicate with one another and the project managers 112 regarding posted projects, etc., using the freelancing platform 104. For example, a project manager 112 could view all available projects through the freelancing platform, which is viewable by the project manager on a network-accessible user device (e.g., mobile phone, tablet, laptop computer, watch). The crowdsourcing platform, freelancing platform, and partner platform 120 could, for example, be accessed through a website (e.g., as a browser-based portal) or through a software application (e.g., for iOS or Android).

Figure 2:
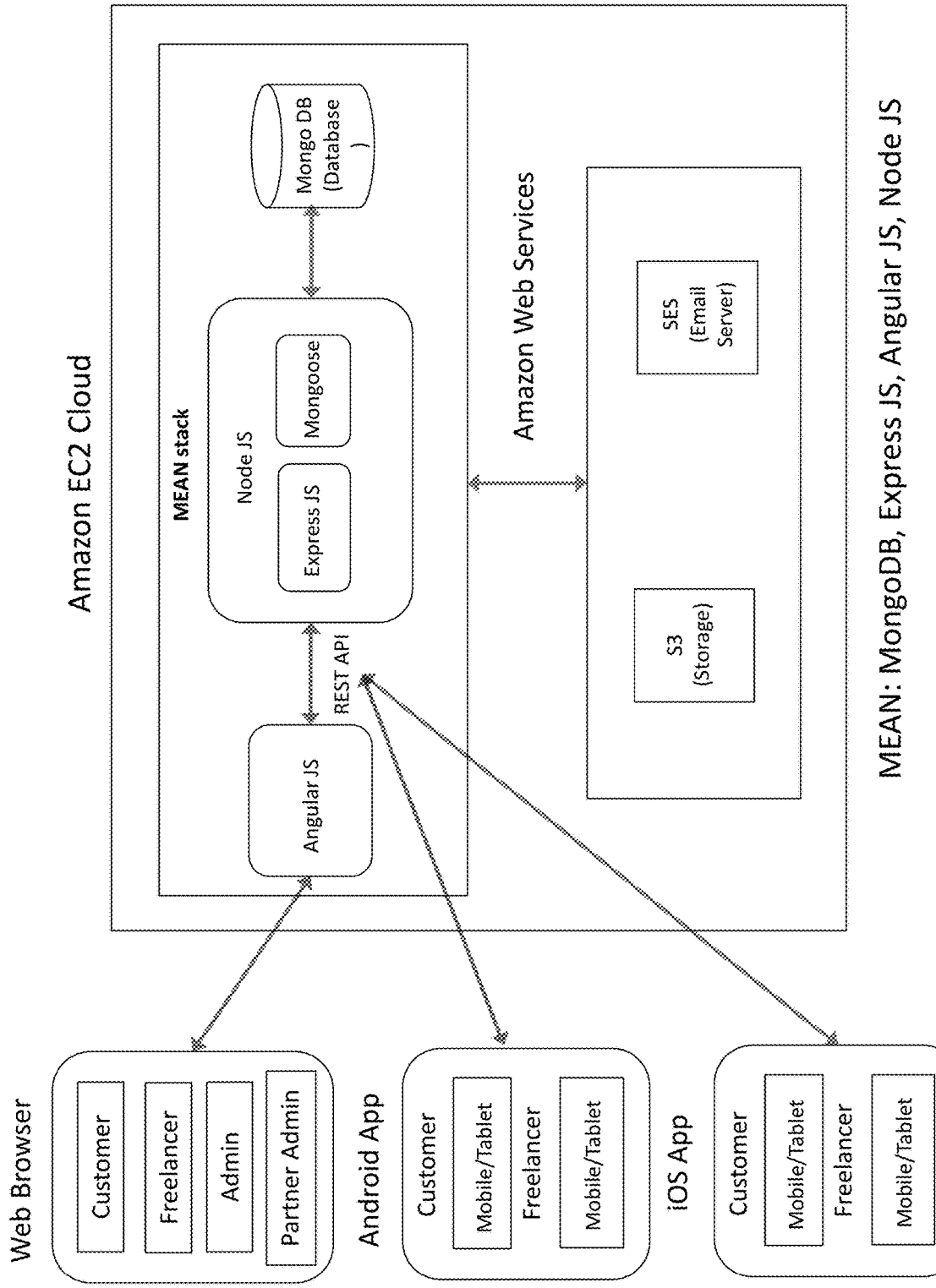
FIG. 2 shows an example of system architecture that may be used to build the crowdsourcing platform, the freelancing platform, the partner platform, and/or the administrative portal.

FIG. 2 shows an example of system architecture that may be used to build the crowdsourcing platform, the freelancing platform, partner platform, partner administrative portal, and/or the administrative portal. The front-end interface is preferably accessible through multiple devices (e.g., via some combination of a Web browser, software program, iOS application, and Android application). The back-end of the crowdsourcing platform, partner platform and/or freelancing platform can be executed by cloud computing services operated by, for example, Amazon Web Services (AWS) or a similar technology. Moreover, the crowdsourcing platform, the freelancing platform, partner platform, partner administrative portal, and the administrative portal could all reside on the same instance of AWS (e.g., but in a different folder using a different port for web access) and share the same database.

The crowdsourcing platform and/or the freelancing platform may be built using the JavaScript MEAN stack (i.e., MongoDB, Express.js, Angular.js, Node.js), for example. In such embodiments, MongoDB can serve as the database server and Angular.js can represent the front-end interface for the platform(s), while Express.js and Node.js can contain the back-end logic for both the Web interface and the mobile application, which can access the Web interface via representational state transfer (REST) application programming interface (API) calls.

Features or services provided by AWS can also be used to implement key functions. For example, AWS Simple Email Server (SES) or an alternate email messaging program may be used to support email functionality, while AWS Simple Cloud Storage (S3) or an alternate storage technology could be used to store content, such as files. Authentication technologies (e.g., the passport program) can be used to authenticate users of the crowdsourcing and/or freelancing platforms. One skilled in the art will recognize that these are examples of technologies that may be used in some embodiments. Other embodiments may implement some or none of these technologies.

Figure 3A:
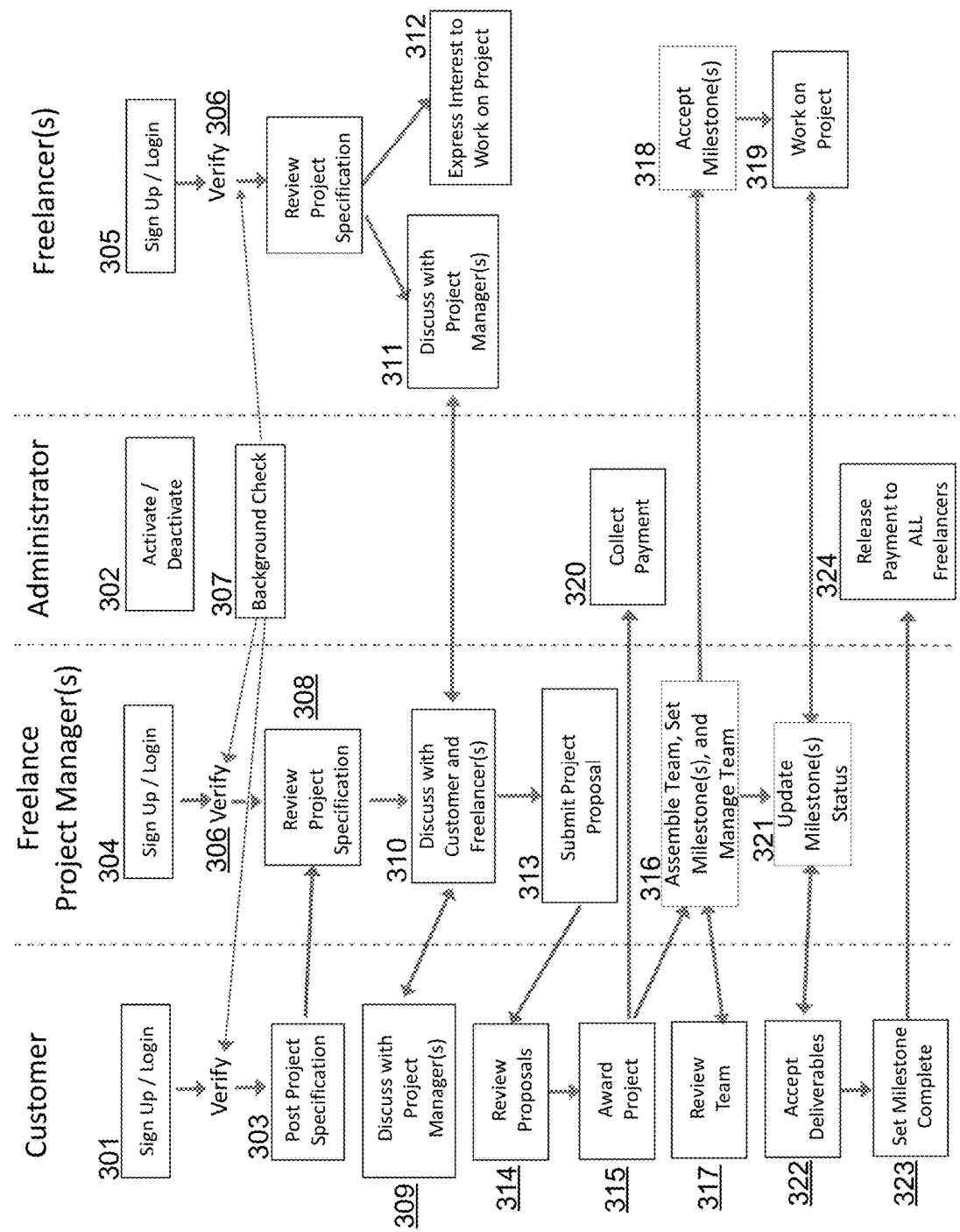
FIG. 3A depicts an example workflow and interactions between a customer, project manager, administrator, and freelancers.
Figure 3B:
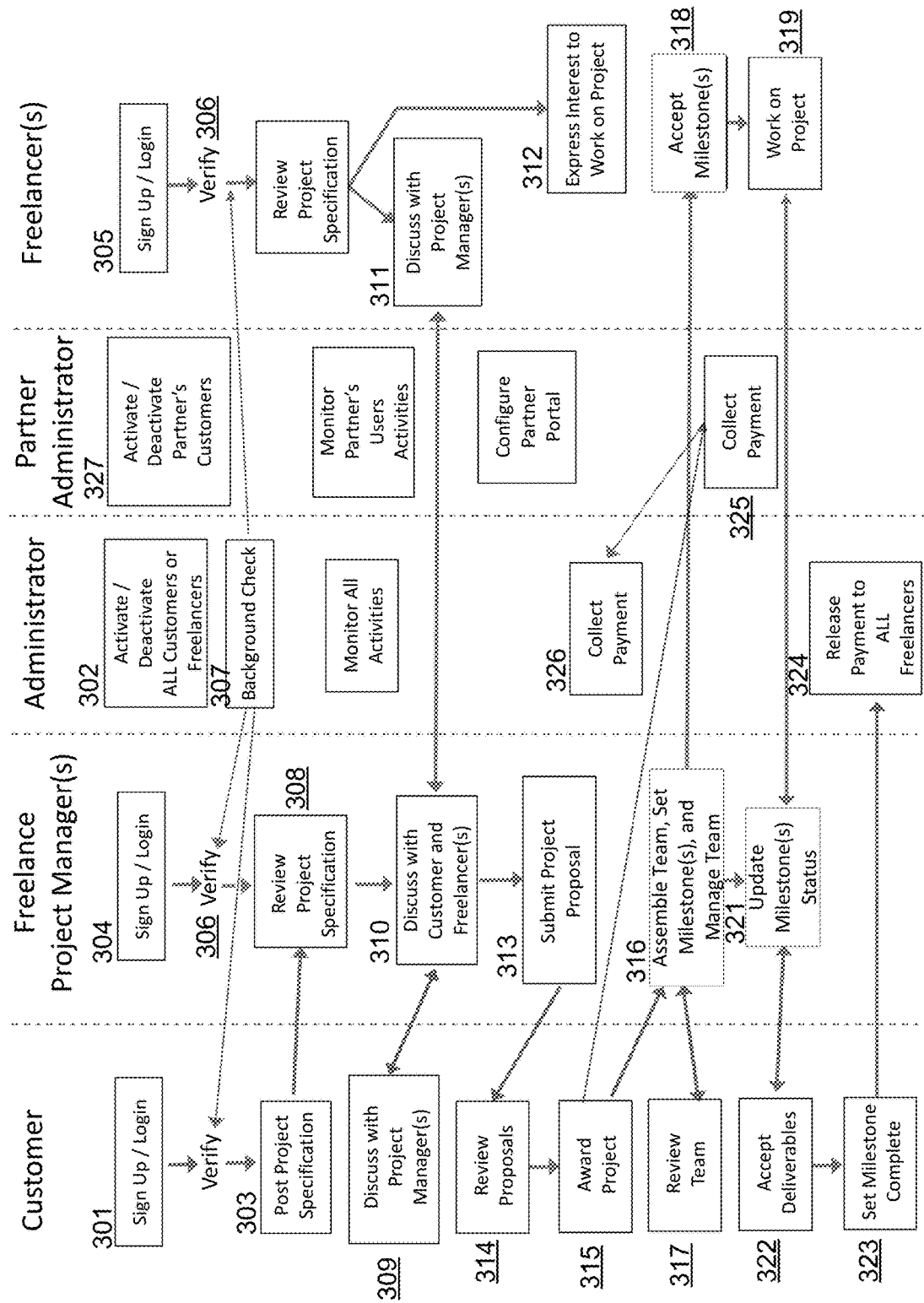
FIG. 3B depicts an example workflow and interactions between a project manager, administrator, partner administrator, and freelancers.

FIG. 3A depicts an example workflow and interactions between a customer, project manager, administrator, and one or more freelancers (e.g., a developer, designer, tester). FIG. 3B depicts an example workflow and interactions between a customer, project manager, administrator, partner administrator, and one or more freelancers (e.g., a developer, designer, tester). Customers are able to sign up and log into the crowdsourcing platform by entering basic information, such as name and company email address (step 301). Before signing up for the crowdsourcing services facilitated by the crowdsourcing platform, customers may have to agree to certain terms and conditions, as well as a privacy policy. After a customer has signed up, an administrator (e.g., an administrator who manages both platforms) verifies the customer and activates the customer's account (step 302). The customer will generally not be permitted to post projects on the crowdsourcing platform until the verification process has been completed by the administrator (e.g., by validating the company has been setup to process payments). Similarly, partner's customers may be able to sign up and log into the crowdsourcing platform by entering basic information, such as name and company email address using the partner platform. Before signing up for the crowdsourcing services facilitated by the crowdsourcing platform, partner's customers may have to agree to certain terms and conditions, as well as a privacy policy. After a customer has signed up, a partner administrator (e.g., an administrator from a partner company, such as a consulting firm) verifies the customer and activates the customer's account (step 327). Partner customers generally are not permitted to post projects on the crowdsourcing platform until the verification process has been completed by the partner's administrator. After the customer has been verified, the customer can post a project specification to the crowdsourcing platform that includes details on the project to be completed by the project manager and one or more freelancers (step 303).

Similarly, project managers and freelancers are able to join the network of freelance talent by registering for the freelancing platform (steps 304 and 305). During the registration process, project managers and freelancers typically sign an agreement that represents an acceptance of the terms and conditions for using the freelancing platform, as well as a privacy policy. The agreement can also, implicitly or explicitly, include non-disclosure language that restricts what the project managers and freelancers are able to disclose about a project. The project managers and/or freelancers also typically enter their email address, home address, and/or other details that are used to verify the project manager/freelancer (e.g., via a background check) (step 306). Creating an account for the freelancing platform can be done by freelancers via manual entry (e.g., by entering information through a web browser) or by linking the account to a social media account, such as LinkedIn, Facebook, or Twitter.

Although anyone can sign up for an account and log into the freelancing platform, in at least some embodiments all freelancers are verified before they can view basic details of projects posted by a customer. Similarly, project managers are verified before they are eligible to view projects posted by customers. The verification process could be entirely or partially automated, and the verification process used for customers, project managers, and freelancers may also be different. For example, project managers are generally subjected to additional (or more thorough) background checks than other freelancers. Once a project manager is verified (e.g., by performing a background check, as shown in step 307), the administrator can activate the project manager's account (step 302), thereby completing the registration process.

In some embodiments, the administrator also has the ability to activate or deactivate customers and/or freelancers at any time, with or without reason. Thus, the administrator can play a role in verifying customers, project managers, and freelancers, in addition to monitoring performance, progress, and other key metrics of the platforms (or of individual projects).

After the project specification is submitted by the customer, the freelancing platform notifies projects managers about the project. For example, the freelancing platform may be configured to automatically generate an email message that is transmitted to all project managers or a subset of project managers that satisfy certain criteria (e.g., project specification indicates domain knowledge of Healthcare is required). Project managers may also be given a deadline to submit their proposals (though this deadline, if established, could be extended by the customer associated with the project or the administrator). Project managers can use the freelancing platform to review the project specification posted by the customer (step 308). In some instances, it may be necessary for a project manager to initiate a discussion with the customer (e.g., to get clarification on the project specification or to ask questions regarding the project) (steps 309, 310). Project managers may also be able to initiate discussions with other freelancers (e.g., developers, designers, or testers) to seek expertise, ask questions, pursue suggestions, etc., that may be necessary to prepare the proposal (steps 310, 311).

Although freelancers are normally only able to see basic information about the project, such as the project title and other information provided by the project manager, freelancers can express interest in the project (step 312), and provide suggestions to project managers on a wide variety of topics that allow the project managers to prepare proposals. The information provided by the freelancers is generally visible to all project managers, although project managers could also solicit individuals privately for answers (e.g., availability during a particular timeframe). Once a project manager has sufficient information to generate and submit a proposal (e.g., through discussion with freelancers and customers or through their own expertise related to the project), the project manager can submit the proposal on the freelancing platform (step 313). The proposal could include, for example, proposed milestones and expected cost(s) for each milestone.

The customer can then review the proposals submitted by the freelance project managers and seek additional clarification, if necessary (step 314). Once the customer has reviewed all of the proposals and acquired sufficient information from the project managers, the customer awards the project to one project manager (step 315). The winning project manager is responsible for completion and delivery of the project.

The winning project manager then creates a team by selecting one or more freelancers (step 316). The customer responsible for posting the project may review the team and ask for additional team member(s) and/or replacement team member(s) if the customer desires additional expertise or believes one or more of the freelancers are not a good fit with the rest of the team (step 317). The selected freelancer(s) could come from the group of freelancers who expressed an interest in the project or previously discussed the project with one of the project managers who submitted a proposal. The winning project manager could also solicit additional freelancers by posting details about the project (e.g., via the freelancing platform), which were previously unavailable to the freelancers. The winning project manager continues assembling freelancers until sufficient talent/experience is found to execute the project. The milestones and pay structure for the team members (i.e., selected freelancers) is typically set by the winning project manager. In some embodiments, all of the team members must review team and accept the milestones and pay structure prior to beginning work on the project (step 318).

Once the winning project manager has assembled the team, the project manager can begin engaging freelancers through the freelancing platform and/or outside the freelancing platform to manage and deliver the project (step 319). The project manager (via the freelancing platform) can indicate when work is completed for each milestone (step 319).

Payment for completion of each milestone can be collected and held in escrow by the administrator or the administrator's associated business entity until each of the milestones has been acknowledged as being completed by the customer (step 320). More specifically, the crowdsourcing platform may be configured to deduct fees and pay the project manager and freelancers (step 324) when the customer accepts the deliverable(s) (step 322) and acknowledges (e.g., through the crowdsourcing platform) that a milestone has been completed (step 323). If a freelancer becomes unavailable or does not perform to expectations during execution of the project, the crowdsourcing platform may refrain from making a payment to the freelancer. In such a scenario, the project manager could also remove the freelancer and target a new freelancer to fill in as a replacement.

Often, payment for completion of each milestone is completed via conventional invoicing of the customer (e.g., by the administrator) for progress made on the project (step 320). For example, when the customer awards the project to a project manager, the administrator would send an invoice to the customer to collect and keep the money in escrow. Similarly, when a partner customer awards the project to a project manager, the partner administrator would send an invoice to the customer, collect the payment (step 325), and pay the administrator to keep the money in escrow (step 326).

If the project manager becomes unavailable or does not perform to expectations, the customer can request a replacement project manager. In such a scenario, the administrator could change the project manager via the administrative portal. Regardless of how the new project manager is selected, the change in project managers is displayed in both the crowdsourcing platform and the freelancing platform upon completion of the change.

In some embodiments, the crowdsourcing platform employs a process that attempts to match the customer with certain project managers. These project managers, who may have been approved by the customer in the past or may have worked on projects for the customer in the past, may receive priority when the customer posts a project. For example, this subset of project managers may be the only project managers who are able to view the project and submit proposals.

The process used to match a customer with project manager(s) could also consider various customer attributes (e.g., industry, company size, geographical location, project area of expertise) and/or project manager attributes (e.g., skills, geographical location, work experience through the platforms or otherwise, industry, language, size of customers worked for in the past). The process may also change over time (e.g., as the customer submits more projects or as the project managers gain experience or expertise). The changes may be automatic employed by the algorithm or manually administered by the administrator. A similar process could also be used by the freelancing platform to match project managers with other freelancers (e.g., developers, designers, testers).

Alternatively, the customer could bypass the above-described process of soliciting proposals from project managers who compete for the project and instead request proposals from one or more project managers based on the qualifications of those project manager(s) (e.g., the contents of their profile, previous projects completed, rating on the platform). The remainder of the process can continue to be performed using the crowdsourcing platform and/or freelancing platform as described above.

Figure 4:
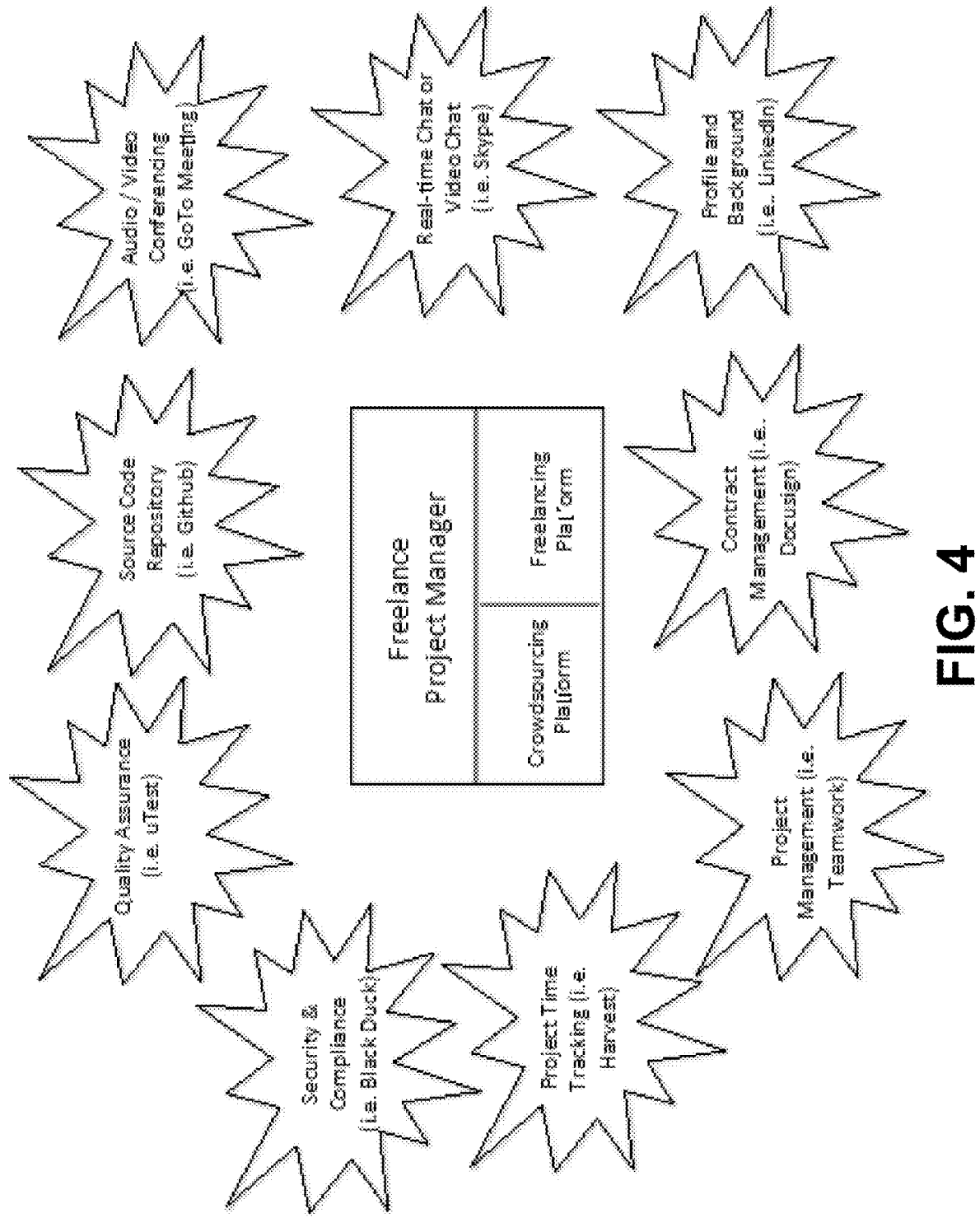
FIG. 4 shows examples of tools that could be leveraged by a customer, project manager, and freelancers to complete a project either outside of or through the freelancing platform.

One of the primary purposes of the crowdsourcing and freelancing platforms is to facilitate the creation of teams of verified freelancers who complete projects on behalf of customers. FIG. 4 shows examples of the different types of tools (e.g., third-party tools, cloud-based technologies) that could be leveraged by the customer, project manager, and freelancers to complete a project, as well as interact with one another. Additional tools may be available on the platforms in certain scenarios (e.g., based on project type or customer type). In some embodiments, the project manager and other freelancers are able to access and use all of these tools from within the freelancing platform. Similarly, in some embodiments, the customer is able to access these tools from within the crowdsourcing platform.

These tools are preferably integrated into the crowdsourcing platform and/or freelancing platform to provide a seamless experience for all users (i.e., the customers, project managers, and other freelancers). As noted above, users may be required to sign a confidentiality agreement upon creating an account for the freelancing system. In such instances, the confidentiality agreements may be signed through Docusign (e.g., through a native Docusign interface or from within the crowdsourcing/freelancing platform, which is enabled by an API integration between the crowdsourcing/freelancing platform and Docusign), for example. Freelancers could also be directed to post code directly to Github using a link or via the freelancing platform if Github integration is enabled.

Security and quality of work product are paramount concerns for crowdsourcing delivery models, such as the ones described herein. In some embodiments, the crowdsourcing platform and/or freelancing platform may employ proprietary technologies (e.g., algorithms, techniques for verifying freelancers) to measure and improve the security of both platforms and/or the quality of deliverables created by freelancers. At the completion of the project or of any milestone, the customer (through the crowdsourcing platform) and/or the project manager (through the freelancing platform) may have the ability to rate and rank each freelancer on the team, the team as a whole, the work product, etc.

FIGS. 5A-N show examples of graphical user interfaces (GUIs) that are viewable through the crowdsourcing platform and with which customers can interact. FIGS. 5A-N collectively illustrate the flow of screens typically navigated by a customer. The customer initially signs up for the freelancing service by providing basic information such as first name, last name, company email address, and password (FIG. 5A). This basic information is then used to generate an account for the crowdsourcing platform.

Once an account has been created, the customer can post a project by specifying various details, such as project title, project description, estimated time, estimated budget range, budget approval status, and expected start date (FIGS. 5B and 5I). The customer can also supply additional profile information or update previously-supplied profile information at any time by logging into the crowdsourcing platform (FIGS. 5C-E). For example, the customer may elect to periodically change the password used to access the crowdsourcing platform in accordance with company rules.

Figure 5F:
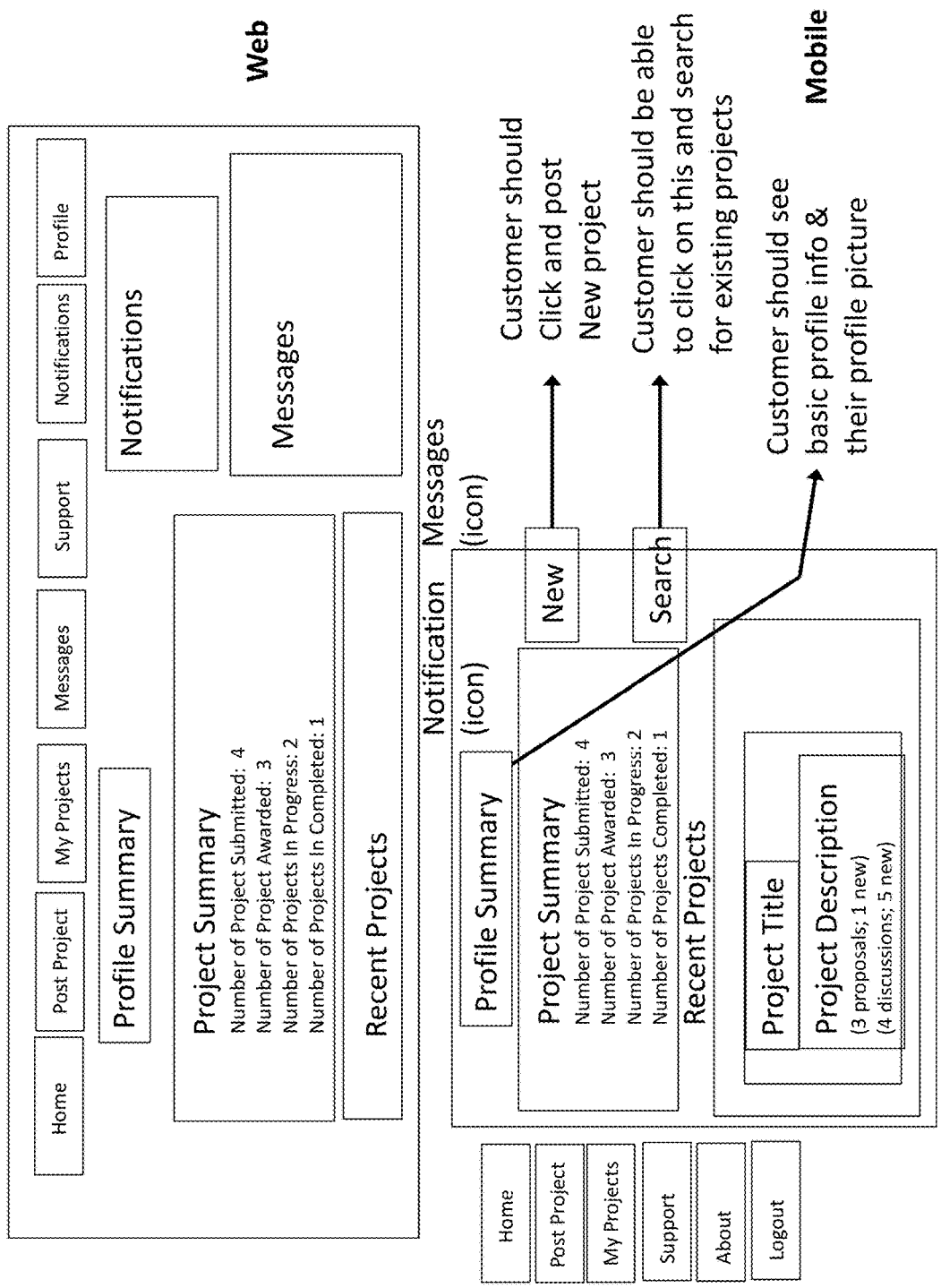
FIG. 5F shows an example of a GUI that is viewable through the crowdsourcing platform and with which a customer can interact.

The customer can be taken to a dashboard page ("dashboard") upon logging in that provides details regarding the customer's profile, previous projects, posted projects, other important or time-sensitive information (e.g., impending deadlines), etc. (FIG. 5F). As noted above, the dashboard may be accessible via a web browser, a mobile application, or both. New customers, meanwhile, can be directed to the new user dashboard that allows each customer to complete a profile, set payment options, and start a new project (FIG. 5G).

Figure 5H:
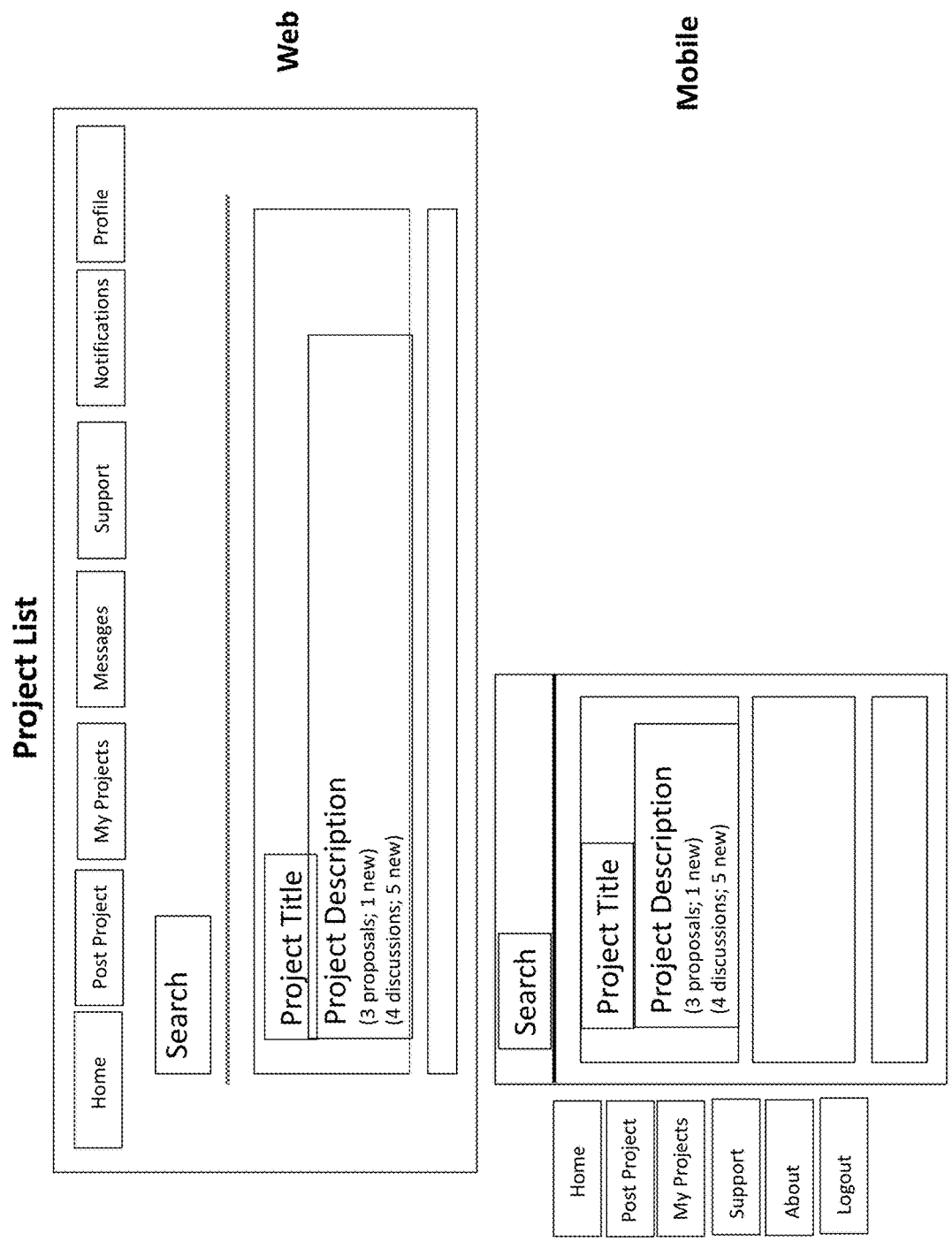
FIG. 5H shows an example of a GUI that is viewable through the crowdsourcing platform and with which a customer can interact.
Figure 5I:
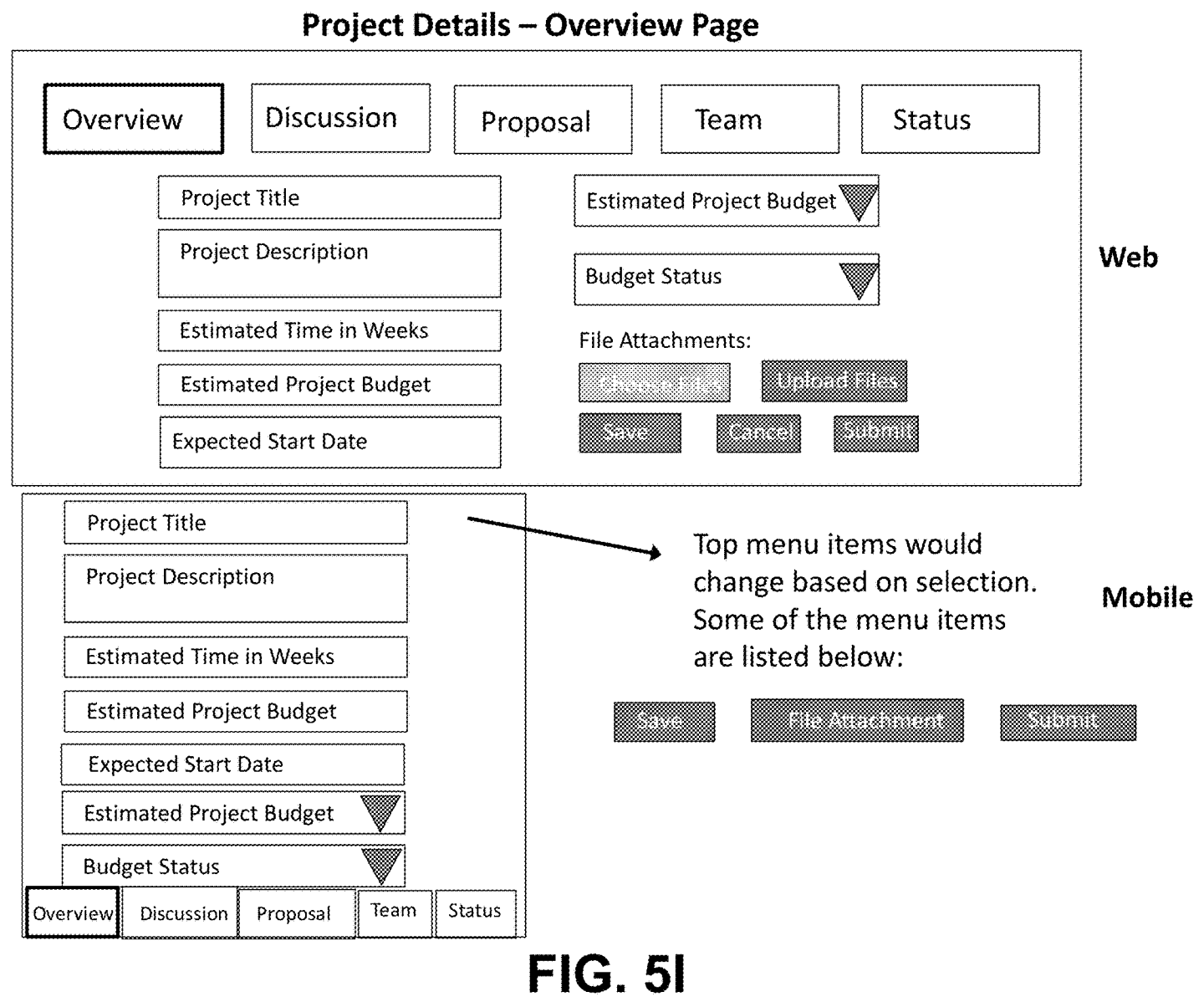
Figure 5J:
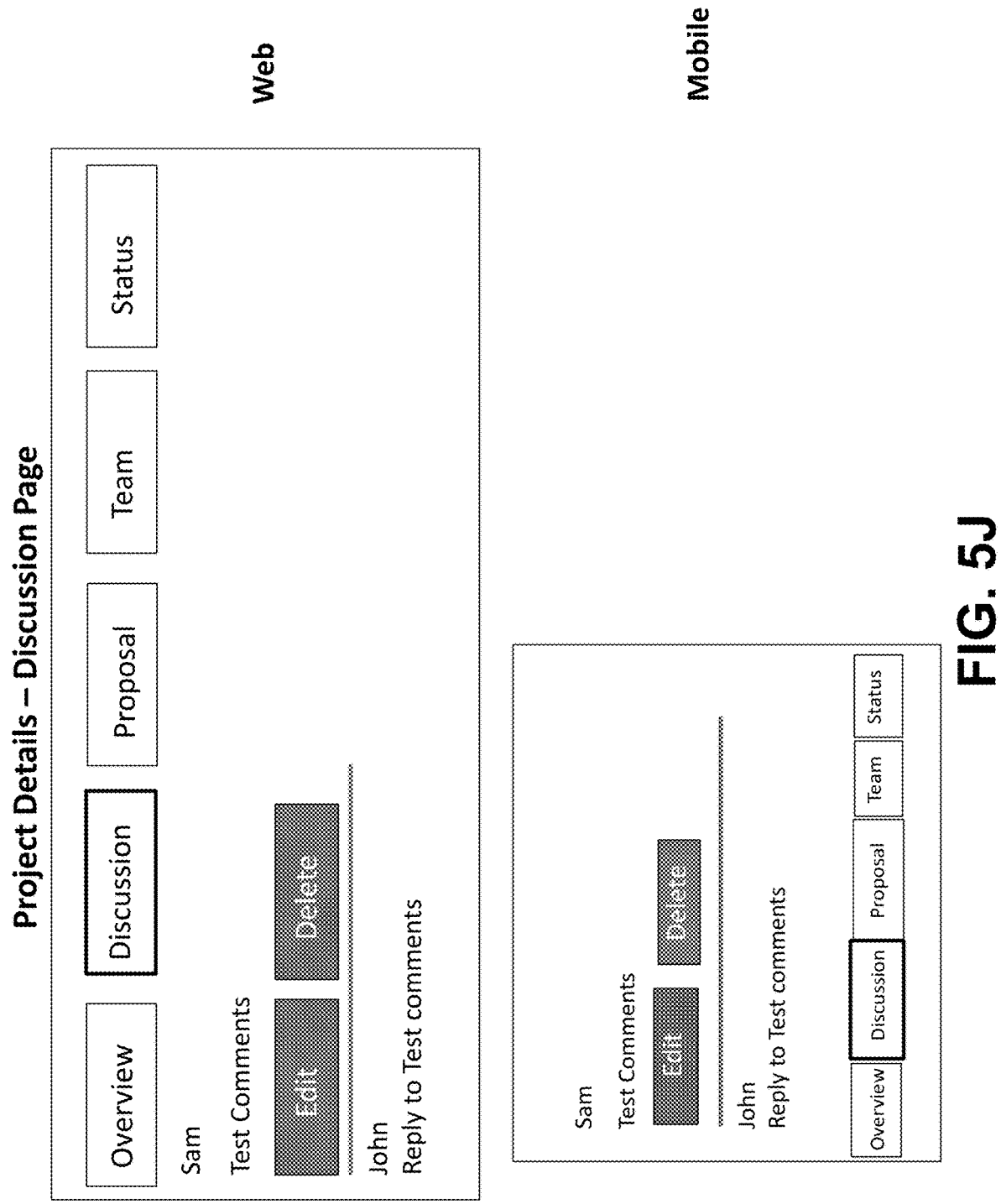
FIG. 5J shows an example of a GUI that is viewable through the crowdsourcing platform and with which a customer can interact.
Figure 5K:
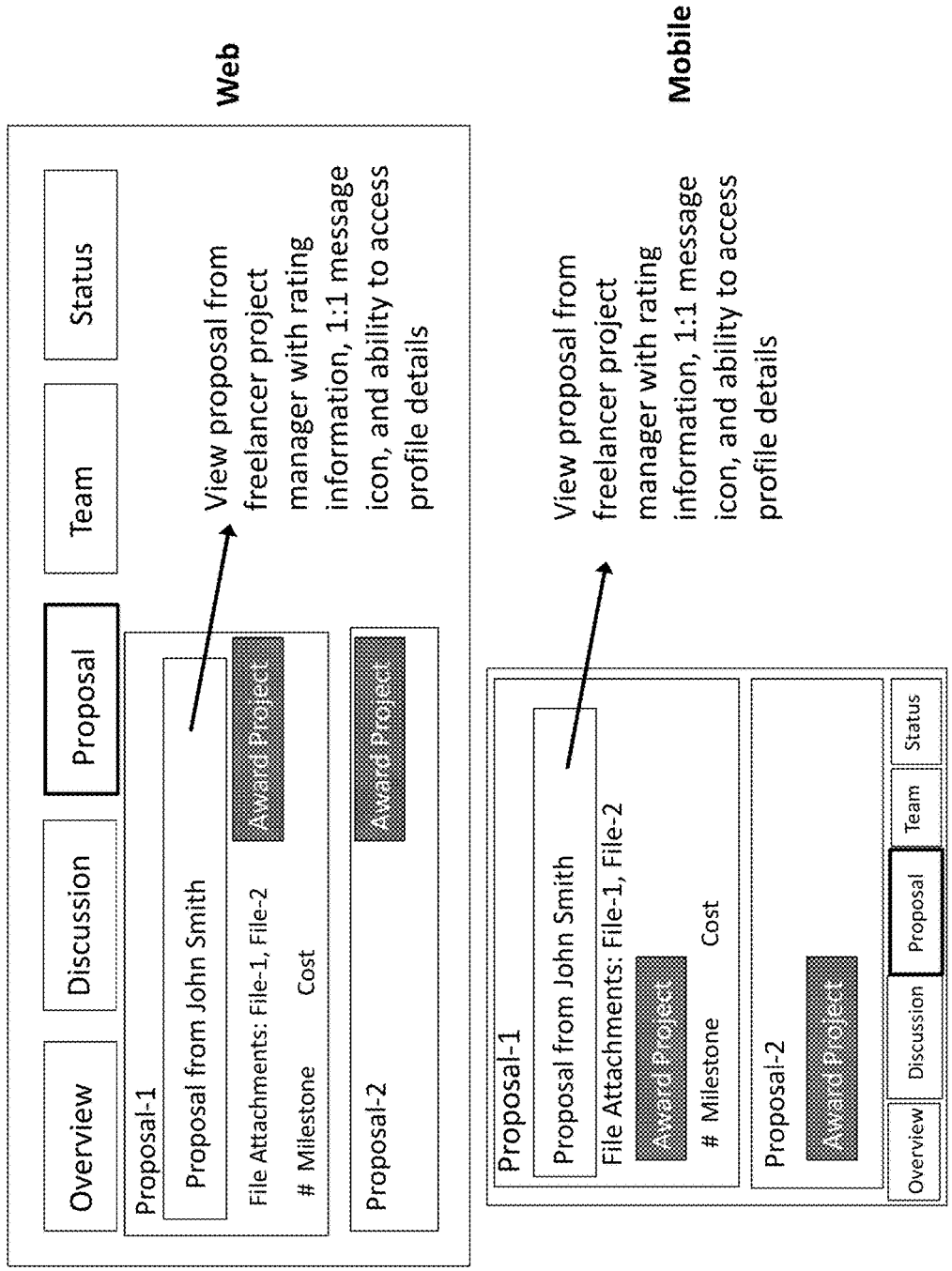
FIG. 5K shows an example of a GUI that is viewable through the crowdsourcing platform and with which a customer can interact.
Figure 5L:
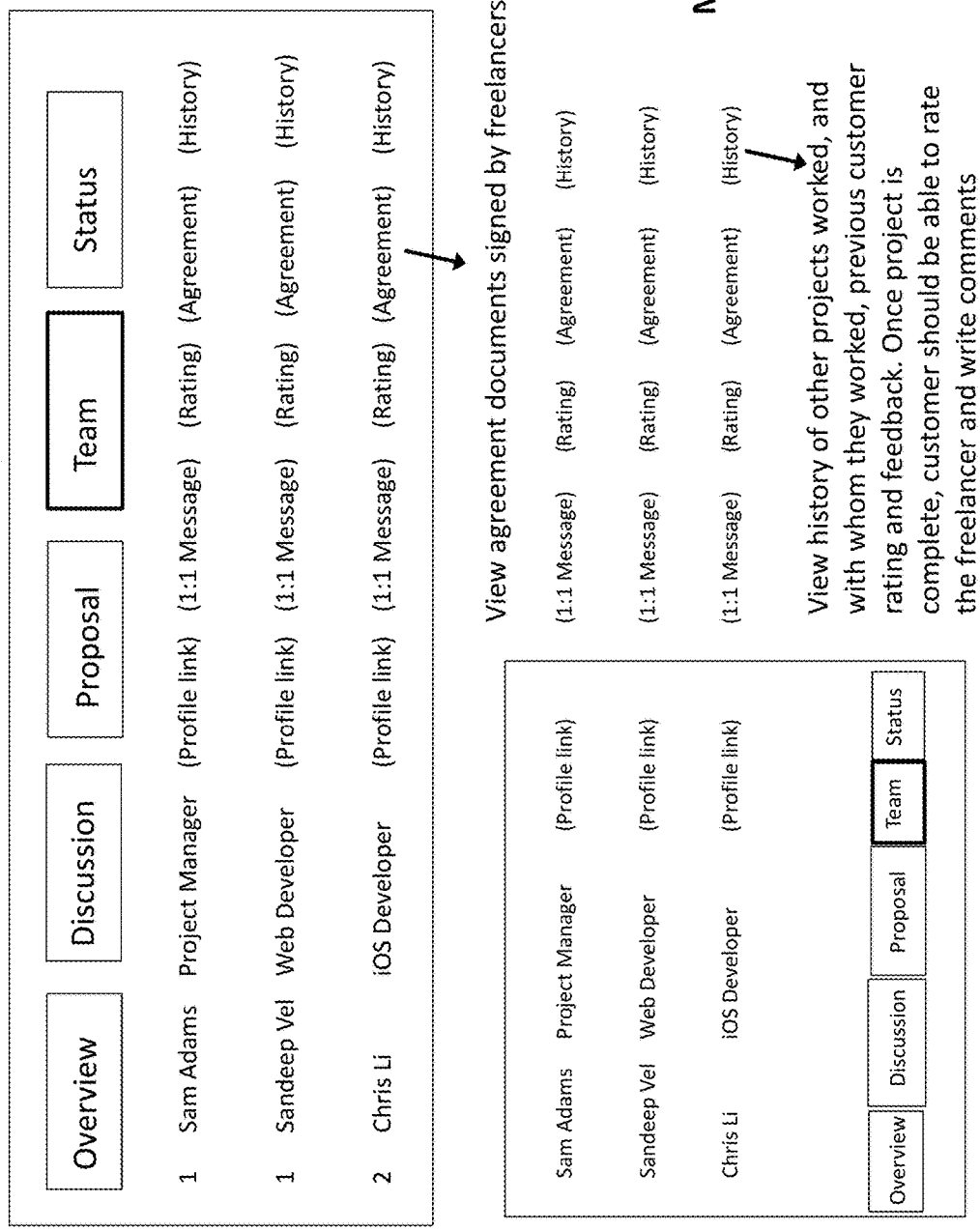
FIG. 5L shows an example of a GUI that is viewable through the crowdsourcing platform and with which a customer can interact.

Customers are able to click on a link to see all projects posted by them (FIG. 5H), discuss posted projects with interested project managers using a message board (FIG. 5J), review proposals submitted by project managers (FIG. 5K), and award projects to specific project managers (FIG. 5K). In some embodiments, customers are able to review the team (i.e., the project manager and those freelancers selected by the project manager), as well as the profile, average rating, and other details for each member of the team (FIG. 5L). The customer may also be able rate the project manager through the crowdsourcing platform. Additionally or alternatively, the customer may be able to view ratings for project managers and/or other freelancers that are generated by one or more algorithms.

Figure 5M:
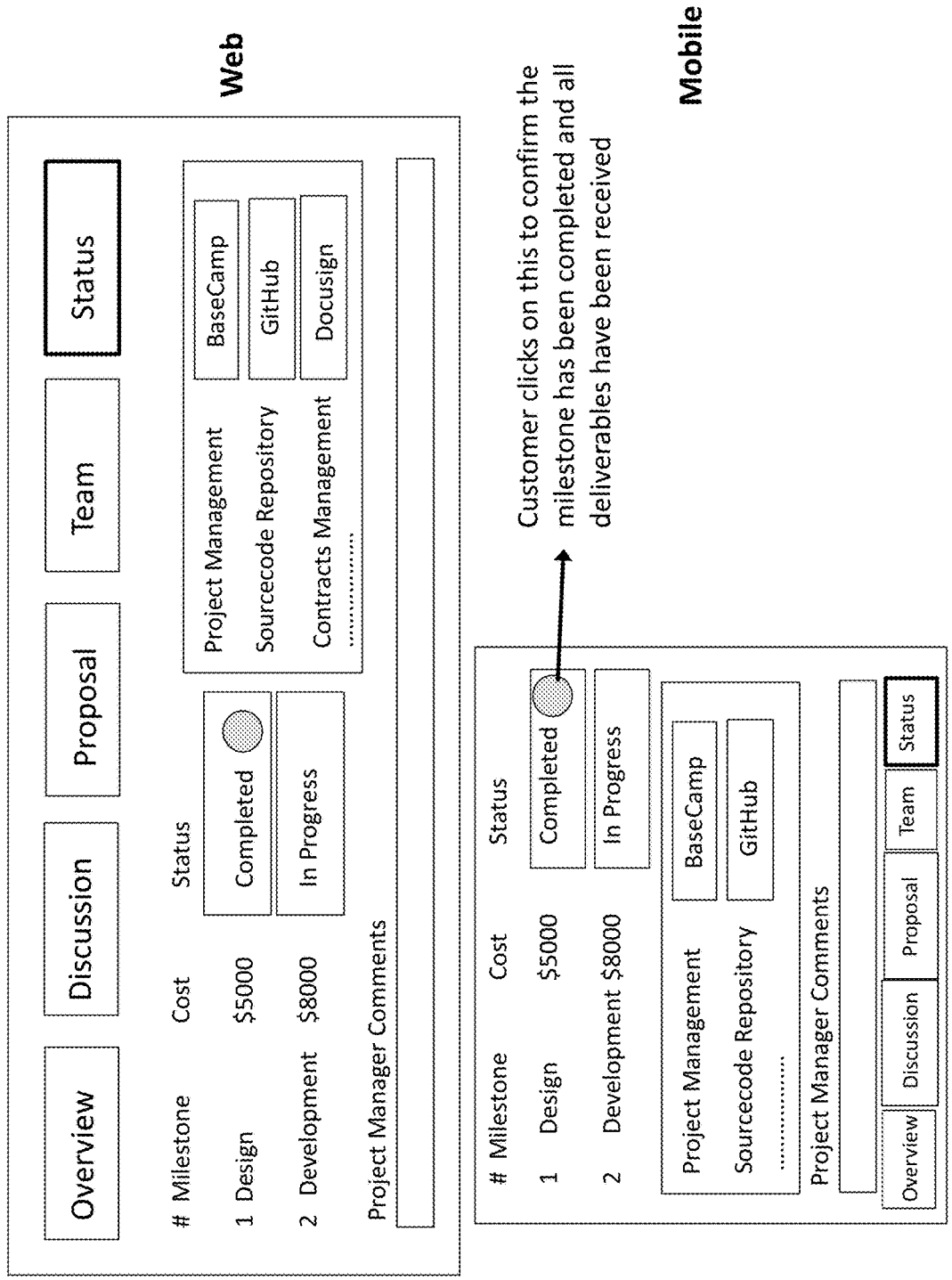
FIG. 5M shows an example of a GUI that is viewable through the crowdsourcing platform and with which a customer can interact.

The crowdsourcing platform can also be configured to support a wide variety of third-party tools (FIG. 5M). For example, as each milestone is hit, the customer could update the status of the milestone (e.g., mark as completed), which prompts the release of the payment to the project manager and/or freelancer(s) from the escrow account maintained by the administrator. Email notifications could also be sent to the customer at different stages of the project (FIG. 5N). For example, an email message could be generated by either platform and delivered to the customer when the project manager or an individual freelancer attempts to contact the customer or when the project manager has marked the project (or a milestone) as having been completed.

Figures 6A, 6B:
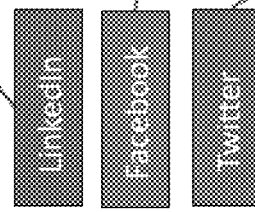
FIG. 6A shows an example of a GUI that is viewable through the freelancing platform and with which a project manager can interact.
FIG. 6B shows an example of a GUI that is viewable through the freelancing platform and with which a project manager can interact.

FIGS. 6A-M show examples of GUIs that are viewable through the freelancing platform and with which project managers can interact. FIGS. 6A-M collectively illustrate the flow of screens typically navigated by a project manager. Project managers initially create an account for the freelancing platform by providing basic information such as first name, last name, and email address (FIG. 6A). A project manager could also use a social networking account (e.g., LinkedIn, Facebook, or Twitter) to sign up to the platform rather than create a new account (FIG. 6B). If a project manager elects to use a social networking account to register for the freelancing platform, information from the social networking account (e.g., name, email, skills) could be used to populate the account for the freelancing platform.

Figure 6E:
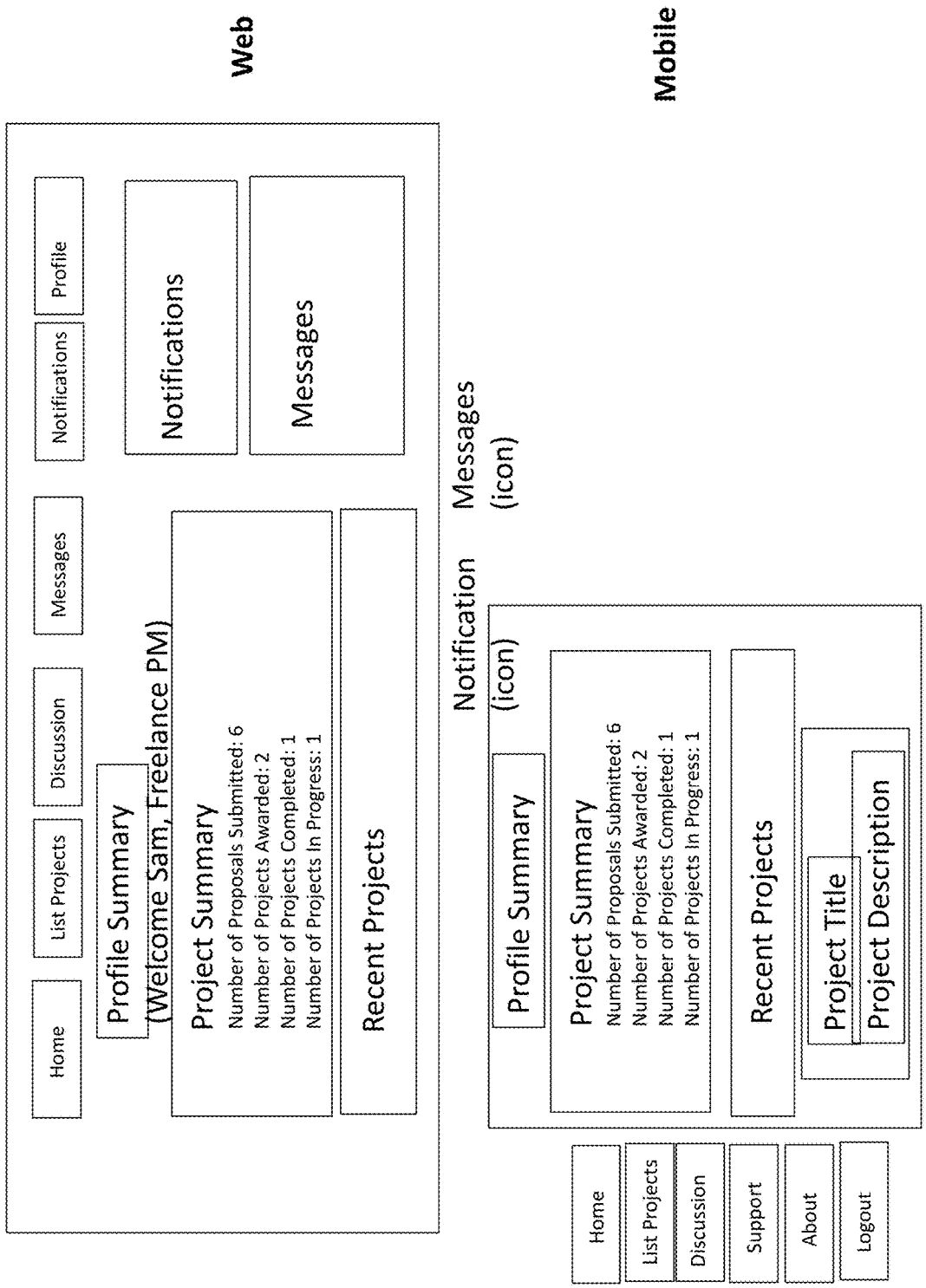
FIG. 6E shows an example of a GUI that is viewable through the freelancing platform and with which a project manager can interact.
Figure 61:
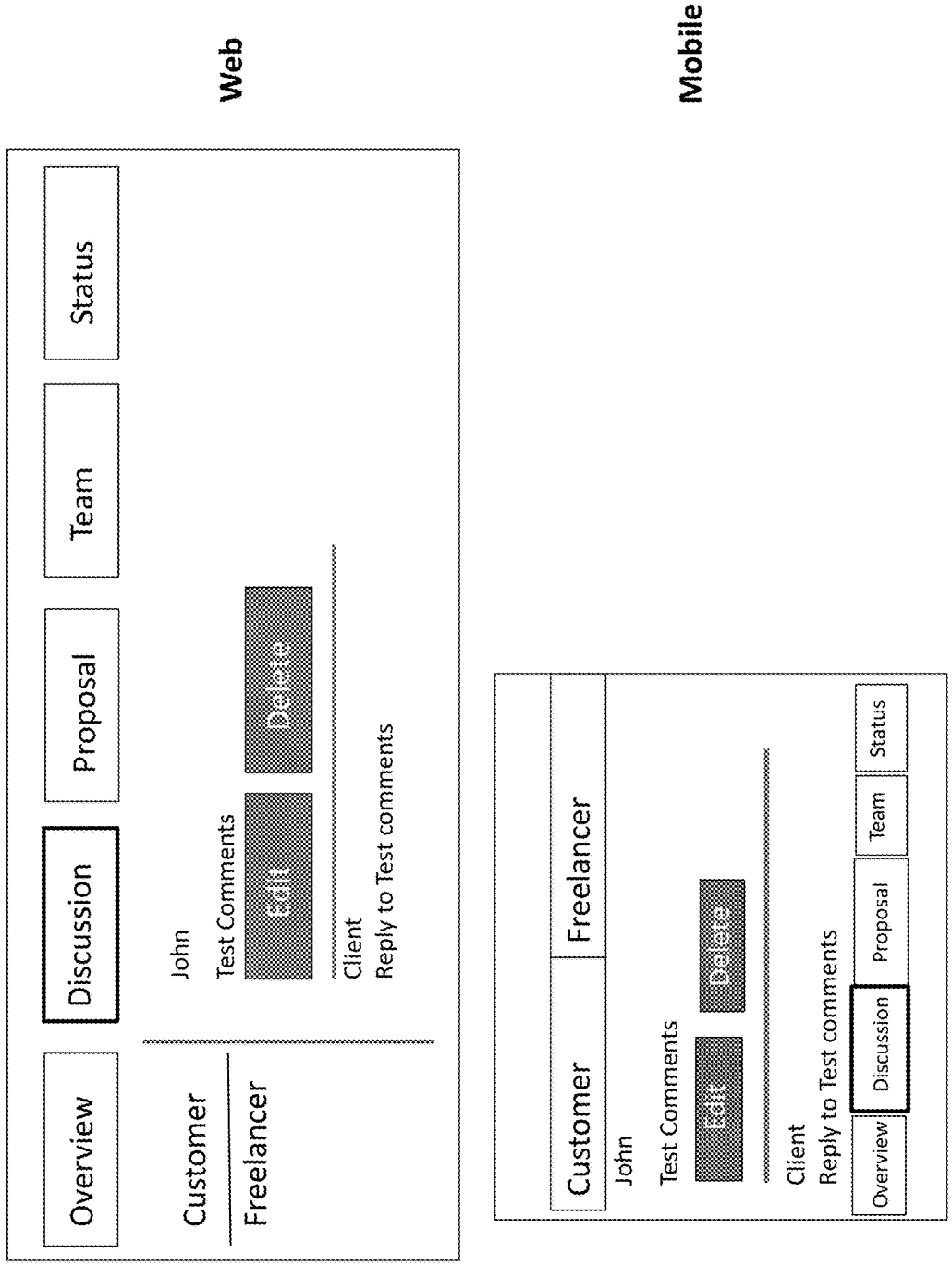
Figure 6K:
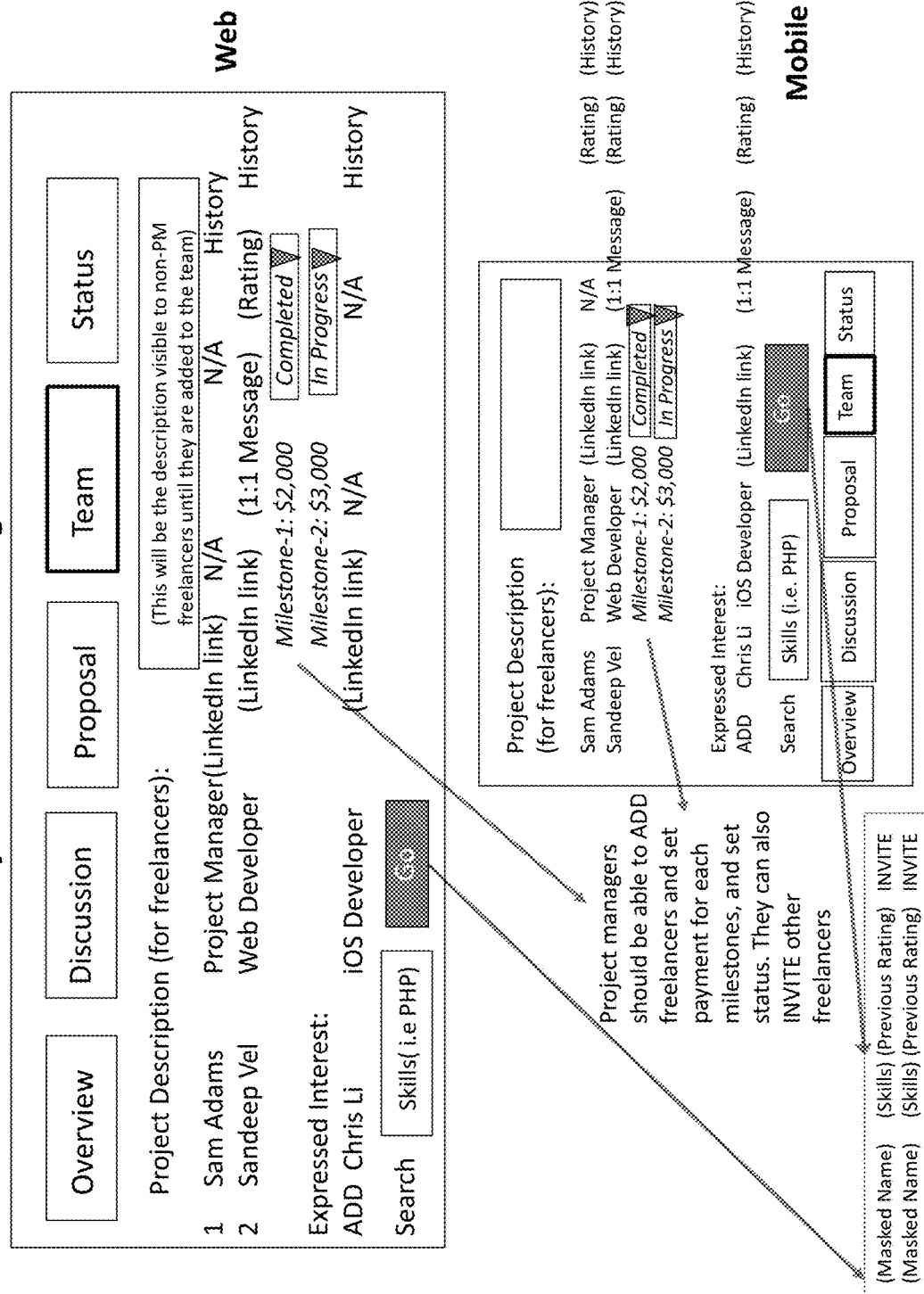
FIG. 6K shows an example of a GUI that is viewable through the freelancing platform and with which a project manager can interact.

Once an account has been created, the project manager can update profile information at any time. For example, the project manager may choose to specify additional details (FIG. 6C) or change a password (FIG. 6D). Upon logging in, a project manager is generally taken to a dashboard page ("dashboard") that provides details regarding the project manager's profile, new projects posted by customers, the status of projects (e.g., submitted, in progress), other important or time-sensitive information (e.g., impending deadlines), etc. (FIG. 6E). Like the dashboard for customers, the project manager dashboard may be accessible via a web browser, a mobile application, or both. New project managers are typically taken to a new user dashboard that allows each project manager to specify what information should be shown on the dashboard upon logging in (FIG. 6F).

Project managers are able to click on links presented on the dashboard to see projects posted by customers and/or search for specific projects (e.g., those projects that match a certain status or project name) (FIG. 6G). Upon selecting a posted project, the project manager can view the project specification posted by the customer, as well as any file attachments provided by the customer (FIG. 6H). Like the crowdsourcing platform, the freelancing platform provides a discussion forum in which project managers can discuss a posted project with a customer or other freelancers (FIG. 6I). The freelancing platform also includes an interface that allows project managers to submit proposals for posted projects (FIG. 6J).

Figure 6L:
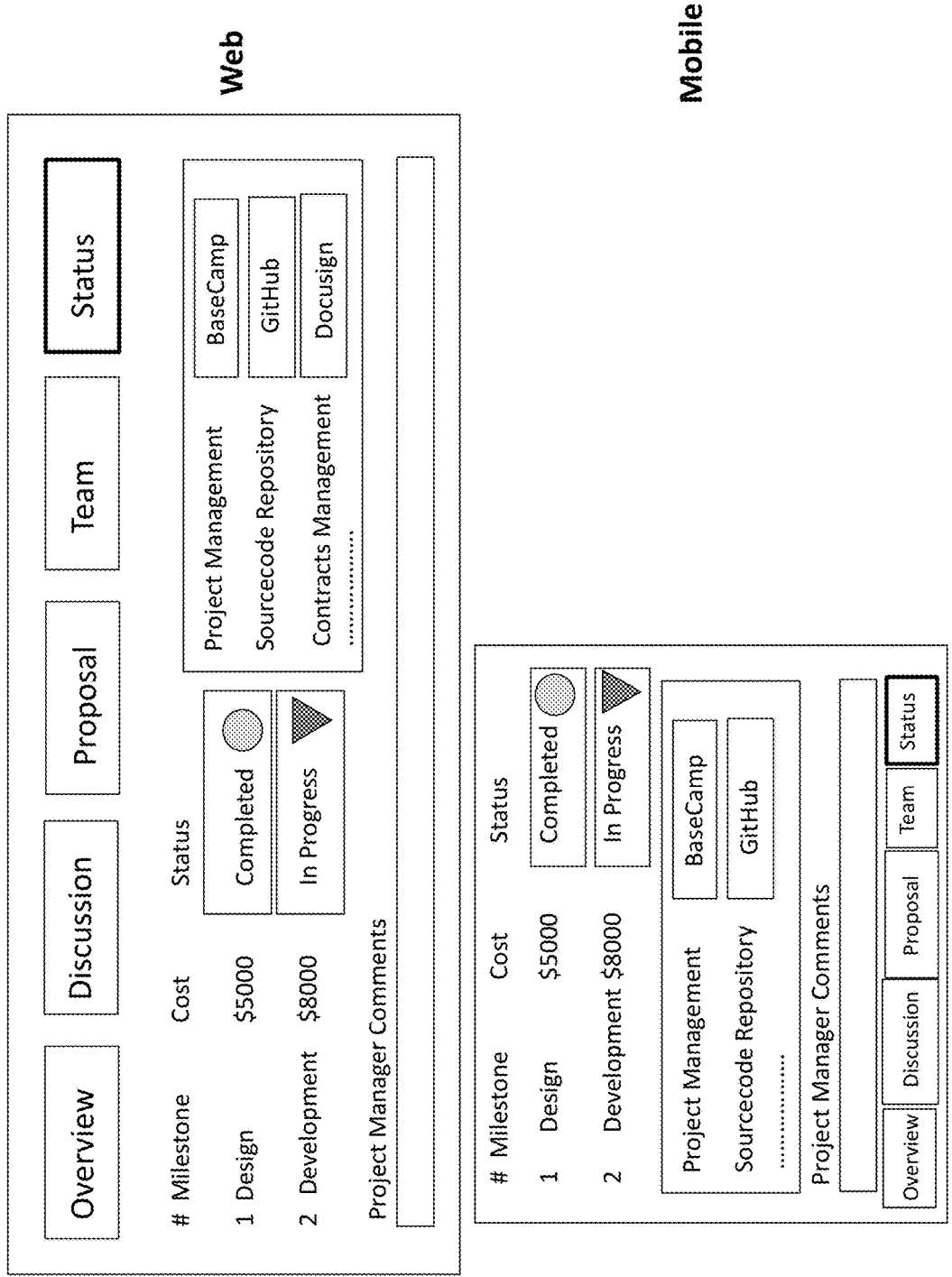
FIG. 6L shows an example of a GUI that is viewable through the freelancing platform and with which a project manager can interact.

A project manager is also able to assemble a team that includes one or more freelancers through the freelancing platform when a project is awarded to the project manager. More specifically, the project manager can select from those freelancers who expressed interest in working on the project, or contributed in freelancer discussions. Additionally or alternatively, the project managers can invite freelancers who did not contribute to discussions or express an interest (FIG. 6K), to participate in discussion or to express interest on the project. For example, the project manager could search for all freelancers whose profiles indicate they have a particular skill or are available during the timeframe in which the project is to be completed. The project manager can then use various tools provided by the freelancing platform, as well as the selected freelancer(s), to complete the project and provide updates to the customer regarding progress (FIG. 6L). When the project or a milestone is completed, the project manager can rate the freelancers included in the team through the freelancing platform. Email messages and/or mobile notifications may be sent by either platform to the project manager when, for example, the customer requests an update or a team member indicates work has been completed (FIG. 6M).

Figures 7A, 7B:
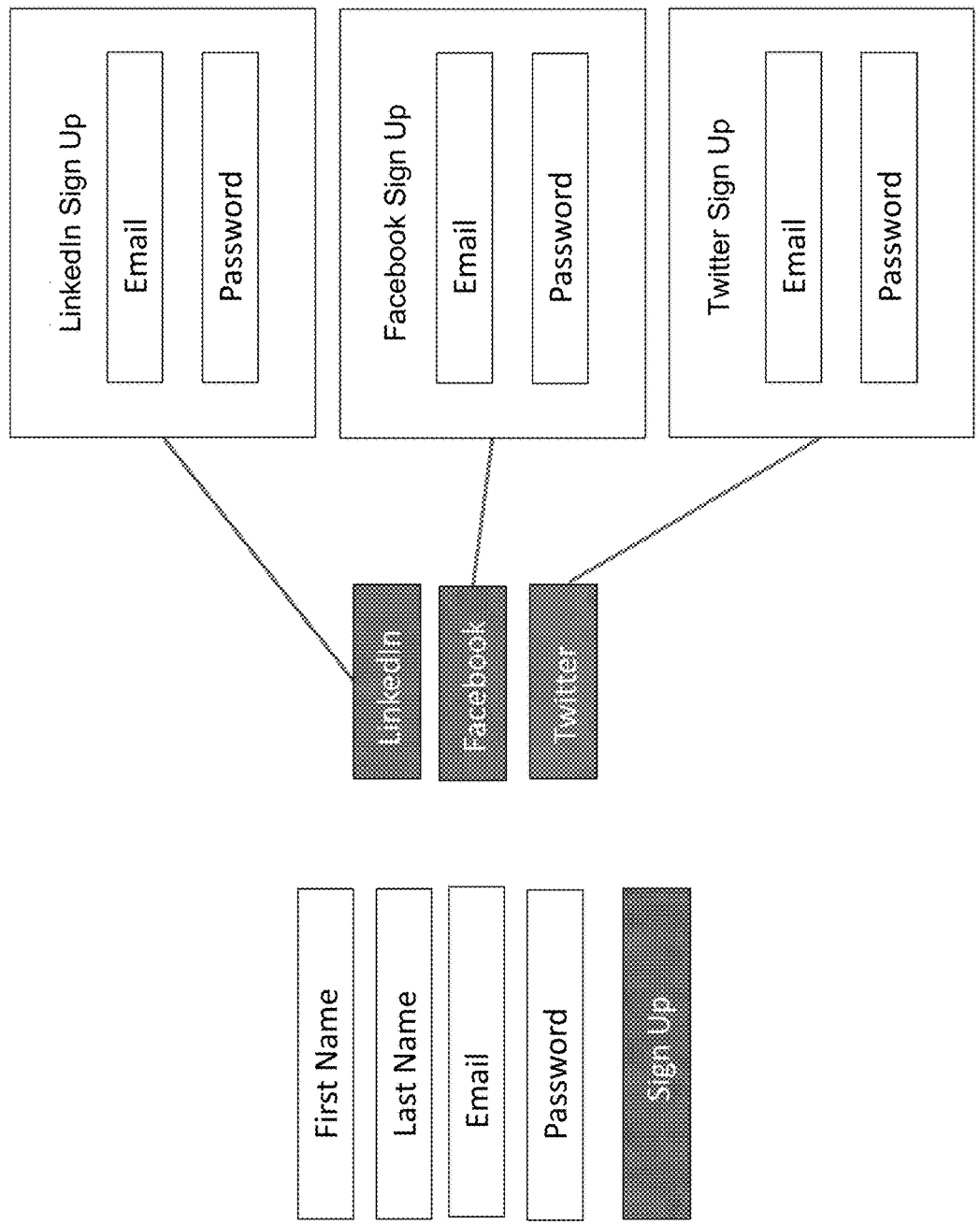
FIG. 7A shows an example of a GUI that is viewable through the freelancing platform and with which a freelancer can interact.
FIG. 7B shows an example of a GUI that is viewable through the freelancing platform and with which a freelancer can interact.

FIGS. 7A-M show examples of GUIs that are viewable through the freelancing platform and with which freelancers (e.g., developers, testers, designers) can interact. FIGS. 7A-M collectively illustrate the flow of screens typically navigated by a freelancer. A freelancer initially signs up for the freelancing service offered by the crowdsourcing and freelancing platforms by providing basic information, such as first name, last name, and email address (FIG. 7A). This basic information is then used to generate an account for the freelancing platform. A freelancer could also use a social networking account (e.g., LinkedIn, Facebook, or Twitter) to sign up to the platform rather than create a new account (FIG. 7B). Once the freelancer has created an account, the freelancer can supply additional profile information, update existing profile information, or change a password at any time (FIGS. 7C-D).

Figure 7E:
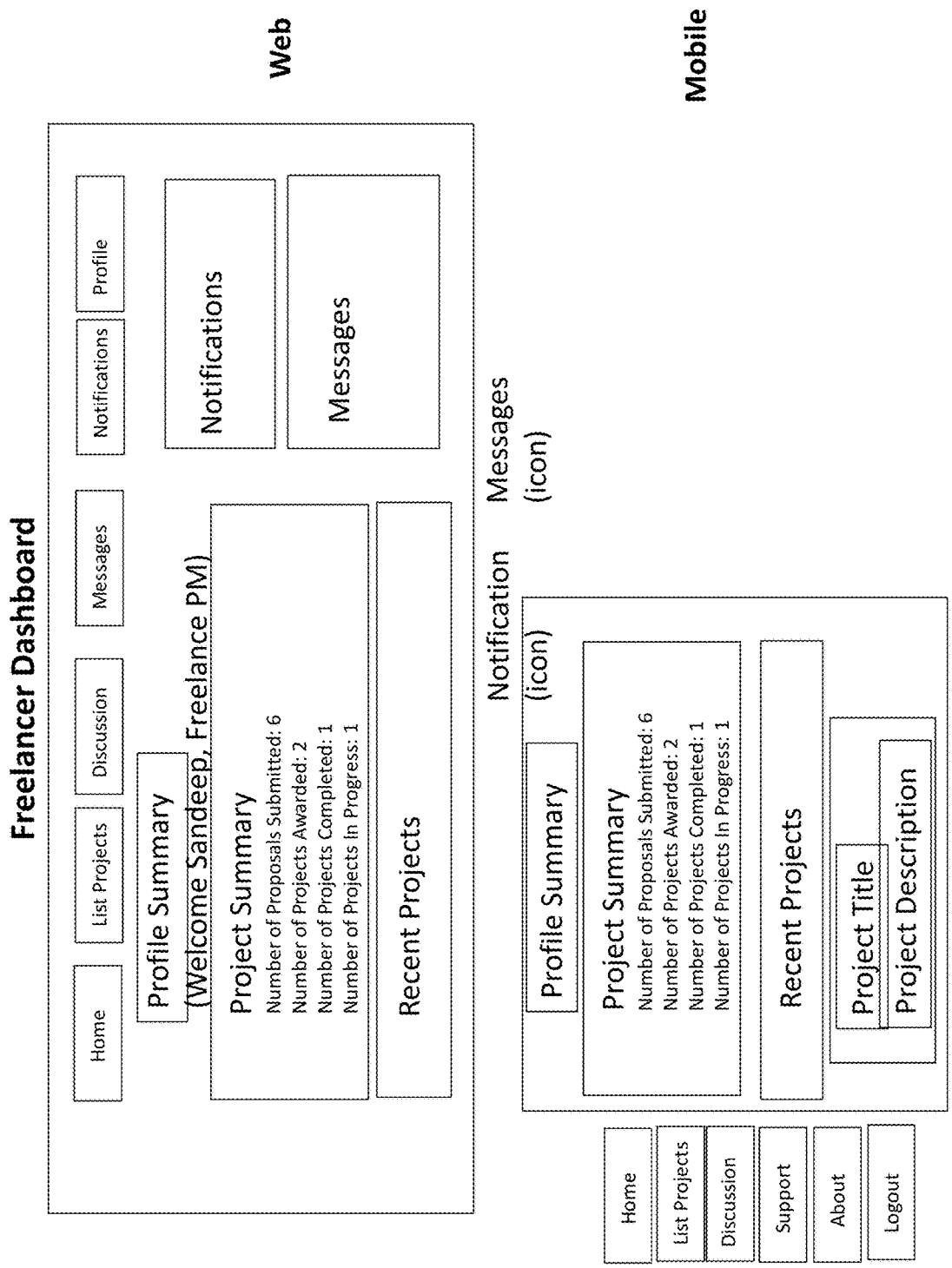
FIG. 7E shows an example of a GUI that is viewable through the freelancing platform and with which a freelancer can interact.

The freelancer is typically taken to a dashboard page ("dashboard") upon logging in that provides details regarding the freelancer, new projects posted by customers, traits desired by project managers who are seeking team members, inquiries from project managers about a position on a development, and other important or time-information (FIG. 7E). New freelancers, meanwhile, are typically directed to a new freelancers dashboard that allows each freelancer to complete profile information, sign an online agreement, and submit documents for verification (e.g., legal documents for completion of a background check) (FIG. 7F).

Figure 7H:
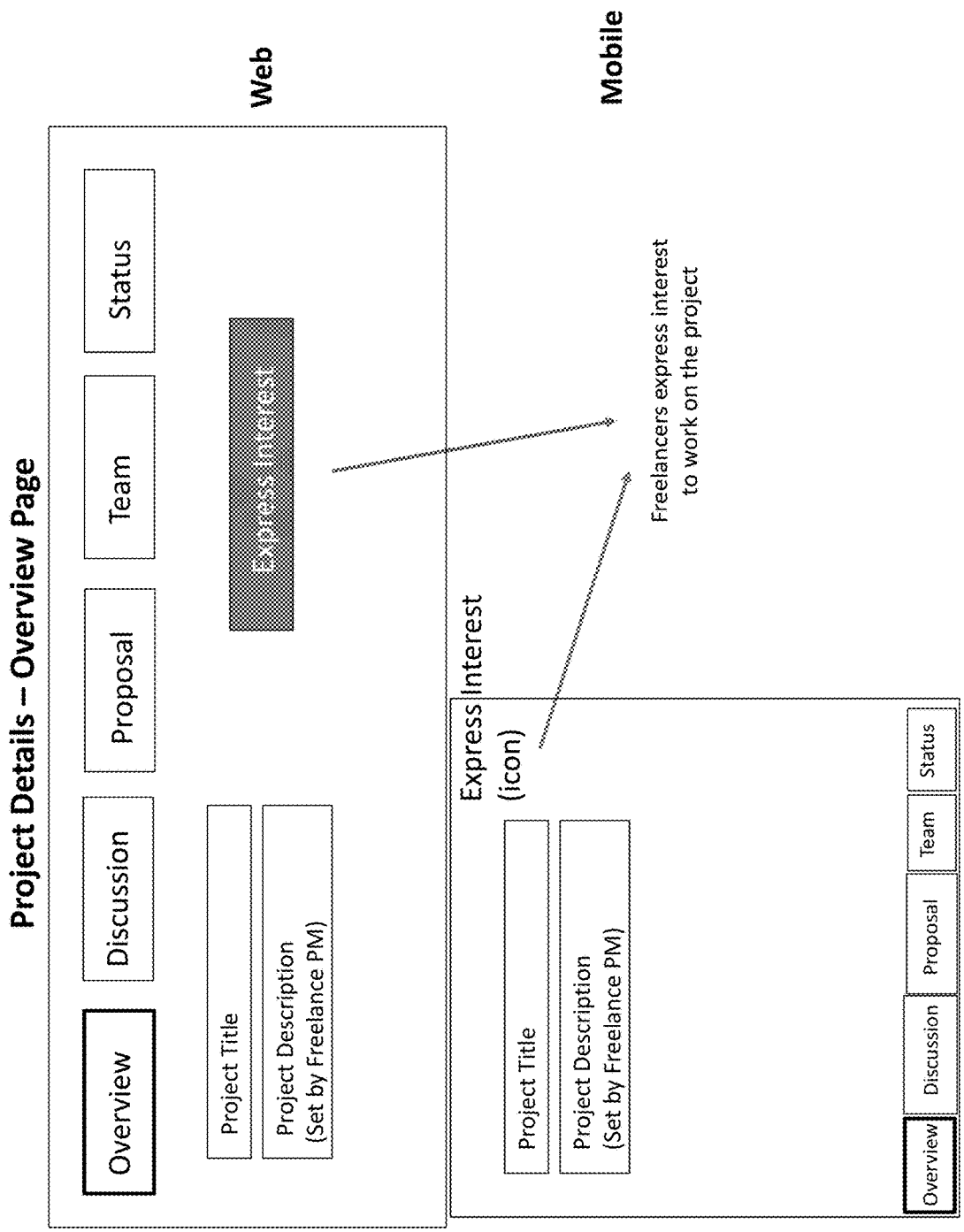
FIG. 7H shows an example of a GUI that is viewable through the freelancing platform and with which a freelancer can interact.
Figure 71:
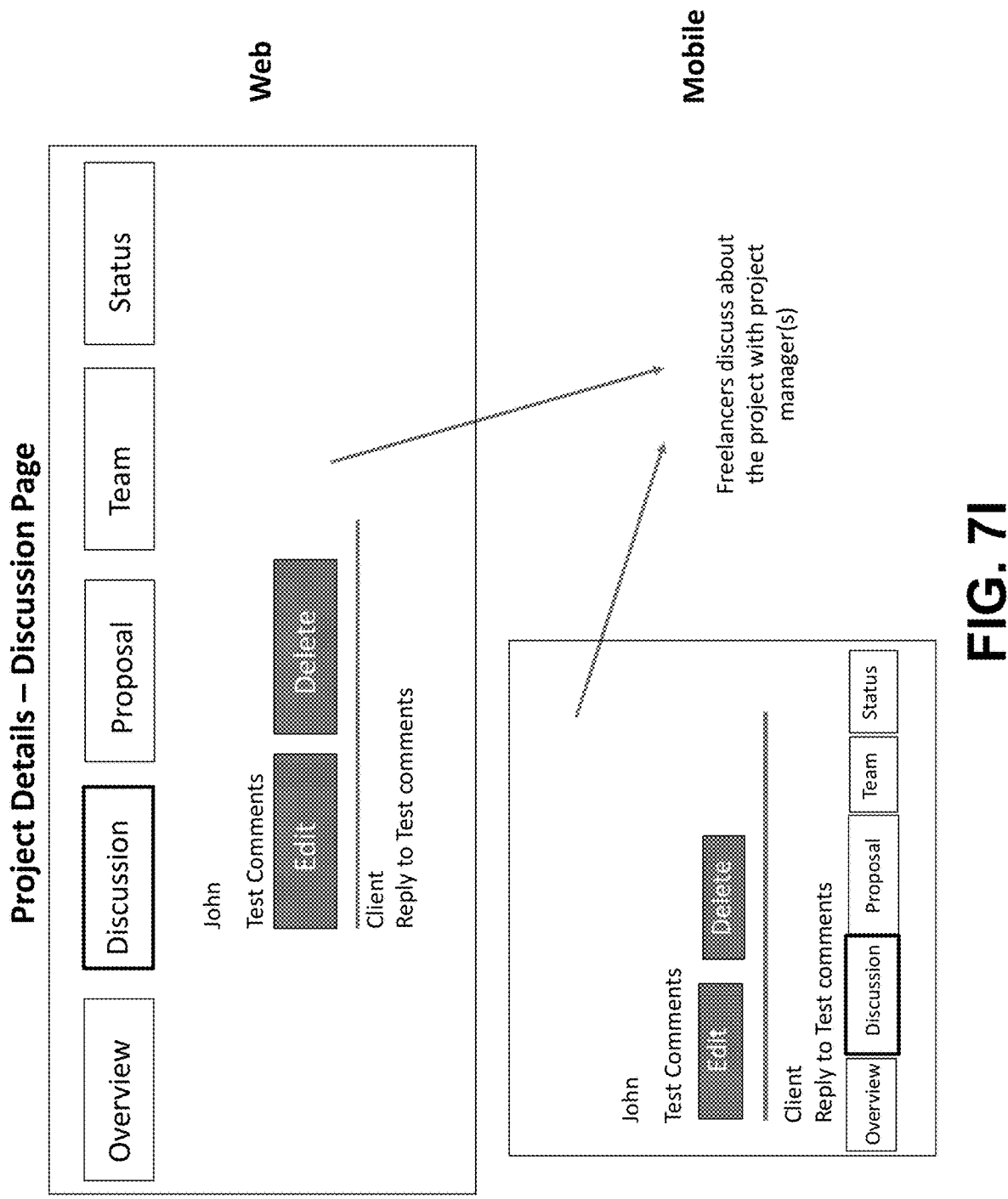

Freelancers may also click on links presented on the dashboard to see projects posted by customers (FIG. 7G) or express an interest in working on particular project(s). Although specific details about a project are generally not available to the freelancers until the project has been awarded to a project manager, some basic details posted by the customer, such as project title, may be visible (FIG. 7H). Thus, file attachments, project descriptions, proposals, etc., are generally not visible by the freelancers until the project is awarded to a project manager, at which time the project description entered by the winning project manager becomes visible to the freelancers. Freelancers can also use a discussion forum to discuss the project with project managers or with one another (FIG. 7I). For example, a freelancer may need additional information regarding expected timelines, necessary skills, etc., before deciding whether he/she is interested in the project. The discussion forum allows freelancers to engage with project managers early on, rather than wait for the project to be awarded to a specific project manager.

Figure 7K:
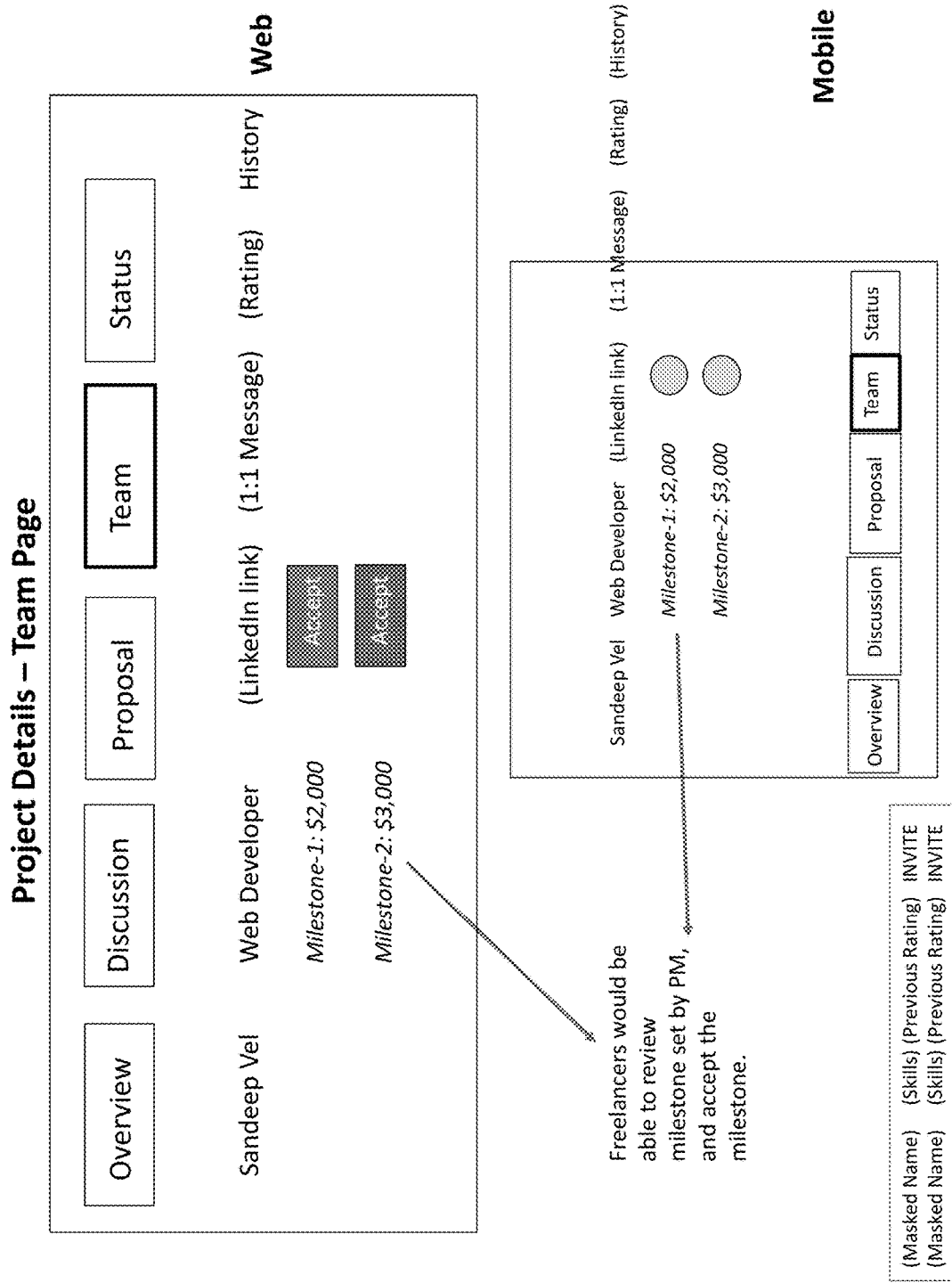
FIG. 7K shows an example of a GUI that is viewable through the freelancing platform and with which a freelancer can interact.
Figure 7L:
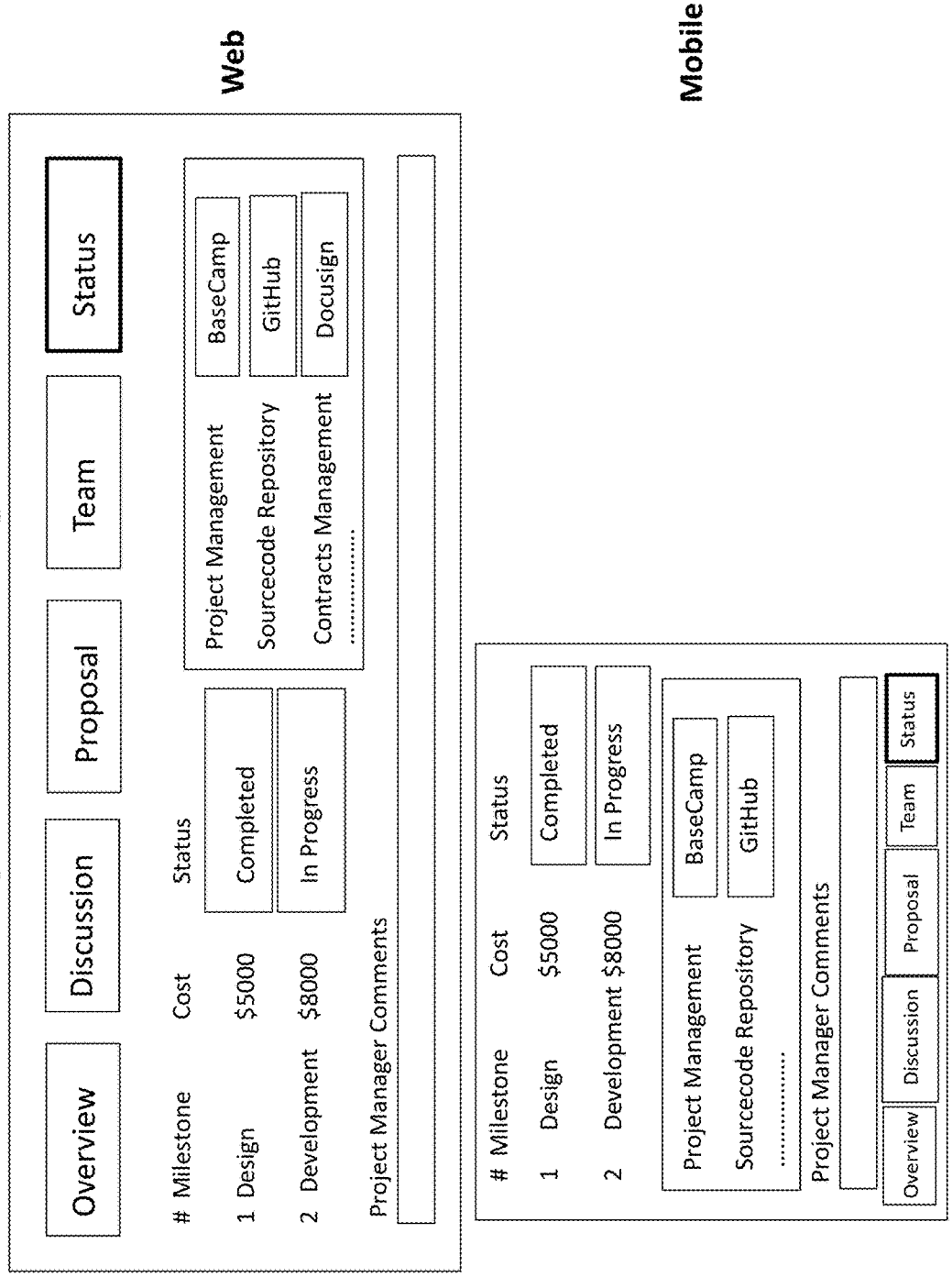
FIG. 7L shows an example of a GUI that is viewable through the freelancing platform and with which a freelancer can interact.

Freelancers are also generally able to see the names of those project managers who have submitted a bid (FIG. 7J). Moreover, if a freelancer is selected by the project manager to be a member of the development team, the freelancer is generally able to see the entire project team (FIG. 7K). Freelancers can then use tools available through the freelancing platform, as well as any other freelancers on the development team, to complete the development milestones set forth in the winning project manager's proposal (FIG. 7L). As described above, an administrator could pay each freelancer (e.g., out of escrow) when a development milestone is completed and confirmed by the project manager and the customer. Email messages and/or mobile notifications may also be sent by either platform to the freelancer when, for example, the project manager requests an update on development or another member of the development team requests additional information (FIG. 7M).

The interfaces viewable by the customers and project managers/freelancers through the crowdsourcing platform and freelancing platform, respectively, are communicatively linked together. Consequently, as customers update the projects posted to the crowdsourcing platform, the information viewable through the freelancing platform will update in real-time. Moreover, these interfaces may be configured to modify their appearance automatically. For example, once a project is awarded to a project manager, that project manager may have access to an additional interface where the project manager can specify characteristics of freelancers they are looking for (e.g., experience, expertise).

Example: Development Project for a Mobile Application

ABC Corporation ("ABC Corp."), which is a mid-size corporation, wants to build a mobile application that can be used by end-users to order food from their mobile devices. A designated representative of ABC Corp. (e.g., Jake Smith, an information technology project manager) creates an account for the crowdsourcing platform and posts a project specification that includes details on the mobile application and how the mobile application is to be built (e.g., which operating systems are to be supported, expected budget, expected timeline). In some embodiments, the freelancing platform also notifies at least some of the project managers that a new project has been posted by ABC Corp.

The project specification is generally visible to all project managers (e.g., through the freelancing platform) who have been verified by an administrator who oversees the crowdsourcing and freelancing systems. However, in some embodiments, the crowdsourcing platform may elect to restrict which project managers are able to view the project specification (e.g., only those project managers who are within a certain geographic area or work in a certain industry). The project managers are then able to review the project specification and submit proposals for the project.

Often, a project manager may need to better understand the project in order to submit a proposal. In such instances, the project manager reaches out to Jake (e.g., via the discussion forum on the freelancing platform) to ask questions regarding the project specification or to request additional details. The project manager can also engage with other freelancers via the discussion forum (e.g., to identify those freelancers with expertise relevant to the project). Once the project manager has sufficient information from Jake and the other freelancers, the project manager can elect to submit a proposal for the project through the freelancing platform that includes a detailed summary of assumptions, milestones, deliverables, and other required information.

Jake then reviews the proposal (as well as proposals submitted by other project managers) using the crowdsourcing platform. The review process typically occurs over a period of time (e.g., one to two weeks), and then Jake awards the project to one project manager (e.g., James Wong) through the crowdsourcing platform. James becomes accountable for the delivery of the project and creates a team that includes other freelancers who have accounts on the freelancing platform. Once the team of one or more other freelancers is formed, James executes the project using tools and resources provided by the freelancing platform, tools provided by third-party providers (i.e., outside the freelancing platform), or some combination thereof.

Here, for example, James' winning proposal includes three milestones:
Milestone 1: Design of the mobile application ($15,000)
Milestone 2: Demonstration and testing of the mobile application ($25,000)
Milestone 3: Completion of the mobile application ($25,000)

Jake Smith can work with the procurement department at ABC Corp. to issue some or all of the payments to an administrator who holds the money in escrow until these development milestones are completed. At the same time, James Wong forms the team that includes one or more freelancers, specifies what resources are available to the team, sets expectations with each freelancer regarding how much they will be paid (e.g., on a per-milestone basis). Here, James has selected two freelancers (Sandeep Vel and Clifton John) who will complete the project.

Generally, each freelancer has a personalized set of milestones. For example, the milestones for Sandeep may include:
Milestone 1 (Customer Milestone: Milestone 1):
Design of the mobile application ($5,000)
And the milestones for Clifton may include:
Milestone 1: (Customer Milestone: Milestone 2):
Demonstration and testing of the mobile application ($8,000)
Milestone 2: (Customer Milestone: Milestone 3):
Completion of the mobile application ($12,000)

James oversees Sandeep and Clifton as work on the mobile application begins and ensures that Sandeep and Clifton complete their individual milestones as the project progresses. James can also lead the team by leveraging the freelancers and the tools provided through the freelancing platform. Once Sandeep has completed the design of the mobile application (i.e., Milestone 1), James can present the design to Jake. If Jake approves the design, Jake confirms the design milestone has been completed through the crowdsourcing platform. The administrator then releases the payment to James and Sandeep upon determining that Jake has acknowledged completion of the milestone. The same process is performed for Milestones 2 and 3. That is, upon confirmation from Jake that the milestone has been completed, the administrator releases the payments to James and Clifton. Jake (or another representative of ABC Corp.) is responsible for ensuring that all deliverables are obtained before confirming (through the crowdsourcing platform) the milestones have been completed.

Computer System

Figure 8:
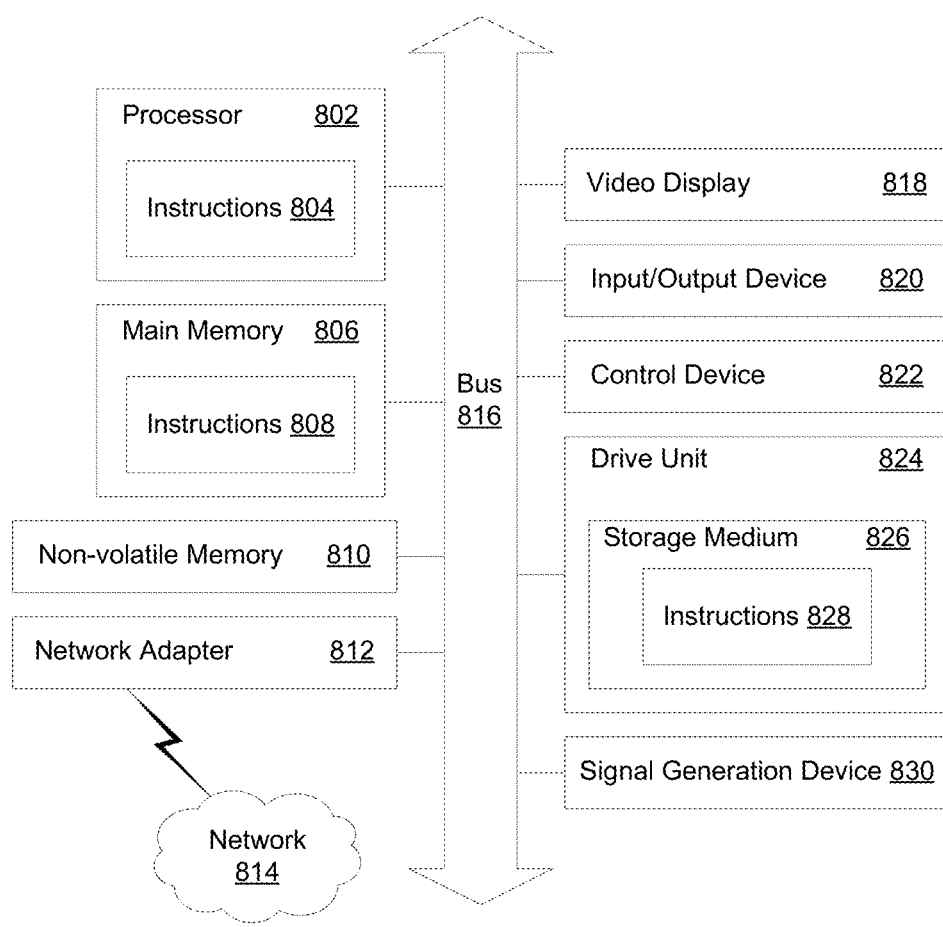
FIG. 8 is a high-level block diagram of a computing system that can be used to facilitate at least some of the techniques described herein.

FIG. 8 is a block diagram illustrating an example of a computer system 800 in which at least some operations described herein can be implemented. Note that a computer system that implements the above-described operations can include multiple distinct computing platforms, which may communicate and/or cooperate with each other via direct communications links and/or one or more networks. The computer system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computer system 800 operates as a standalone device, although the computer system 800 may be connected (e.g., wired or wirelessly) to other machines. In a networked deployment, the computer system 800 may operate in the capacity of a server or a client machine in a client-server network environment, or as a peer machine in a peer-to-peer (or distributed) network environment.

The computer system 800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computer system.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computer system and that cause the computer system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the computer system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 810, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 812 enables the computer system 800 to mediate data in a network 814 with an entity that is external to the computer device 800, through any known and/or convenient communications protocol supported by the computer system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, by a computer system, first input that specifies details of a project to be outsourced by a company;
causing, by the computer system, display of the details on a first interface that is accessible to a plurality of managers who are in competition with one another to be selected to manage the project;
receiving, by the computer system, second input that is indicative of a plurality of proposals for completing the project,
wherein each proposal of the plurality of proposals is submitted by a different one of the plurality of managers via the first interface;
causing, by the computer system, display of the plurality of proposals on a second interface that is accessible to a representative of the company;
receiving, by the computer system, third input that is indicative of a selection of a proposal from among the plurality of proposals by the representative; and
in response to receiving the third input,
notifying, by the computer system, a manager associated with the proposal of the selection; and
permitting, by the computer system, the manager to communicate with a worker who is responsible for performing work in the project under supervision of the manager.

2. The method of claim 1, further comprising:
receiving, by the computer system, fourth input that is indicative of a selection of the worker from among a pool of workers; and
permitting, by the computer system in response to receiving the fourth input, the manager to collaborate with the worker on the work via the first interface.

3. The method of claim 1, wherein said notifying comprises performing at least one of:
transmitting an email message to an email address that is associated with the manager,
transmitting a text message to a phone number that is associated with the manager, or
causing a notification to be presented by a computer program executing on a user device that is associated with the manager.

4. The method of claim 1, wherein the details are input by the representative through the second interface.

5. The method of claim 1, wherein the second interface is accessible to the representative but not the manager or the worker.

6. The method of claim 1, wherein the first interface is accessible to the manager but not the representative or the worker.

7. The method of claim 1, further comprising:
determining, by the computer system, whether any workers included in a pool of workers previously indicated an interest in the company, the project, or the proposal; and
in response to a determination that the worker indicated an interest in the company, the project, or the proposal,
retrieving, by the computer system, information regarding the worker from a storage medium; and
transmitting, by the computer system, the information to the manager.

8. The method of claim 1, wherein the proposal specifies a plurality of milestones to be completed under the supervision of the manager, and wherein the method further comprises:
enabling, by the computer system, the manager to
select a plurality of workers, including the worker, from among a pool of workers, and
assign each worker of the plurality of workers to a different one of the plurality of milestones.

9. The method of claim 8, further comprising:
prompting, by the computer system, each worker of the plurality of workers to rate the manager upon completion of a corresponding milestone; and
receiving, by the computer system, fourth input that is indicative of a plurality of ratings from the plurality of workers.

10. The method of claim 8, further comprising:
prompting, by the computer system, the manager to rate each worker of the plurality of workers upon completion of a corresponding milestone; and
receiving, by the computer system, fourth input that is indicative of a plurality of ratings from the manager.

11. The method of claim 1, wherein the first and second interfaces are accessible via separate portals that are able to interface with the computer system via an application programming interface.

12. The method of claim 1, further comprising:
generating, by the computer system, a third interface that is accessible to a customer of a partner of the company; and
enabling, by the computer system, the customer to access the second interface via the third interface.

13. A system comprising:
a first network-connected platform; and
a second network-connected platform configured to:
receive first input that specifies details of a project to be outsourced by a company,
transmit, via a computer network, the details to the first network-accessible computing platform for display to a plurality of managers who are in competition with one another to be selected to manage the project,
receive, via the computer network, a plurality of proposals for completing the project from the first network-accessible computing platform,
wherein each proposal of the plurality of proposals is submitted by a different one of the plurality of managers via the first network-connected platform, and
receive third input that is indicative of a selection of a proposal from among the plurality of proposals;
wherein the first network-connected platform is configured to, upon the second network-connected platform receiving the third input, permit the manager to communicate with a worker who is responsible for performing work in the project under supervision of the manager.

14. The system of claim 13, further comprising:
a data storage facility that is accessible to the first and second network-connected platforms.

15. The system of claim 14, wherein the second network-connected platform is further configured to:
- generate a data record for storage in the data storage facility that includes the details of the project.

16. The system of claim 13, wherein the first network-connected platform is further configured to:
- generate an interface through which the manager is able to select the worker from among a pool of workers and monitor progress on the work performed by the worker.

17. The system of claim 16, wherein the interface permits the worker to communicate with the manager but prevents the worker from communicating with a company representative who is responsible for reviewing the plurality of proposals unless the communication has been approved or initiated by the company representative, the manager, or an administrator responsible for managing the first and second network-connected platforms.

18. The system of claim 13, wherein the first network-connected platform is further configured to:
- ensure that each manager of the plurality of managers has been verified by an administrator responsible for managing the first and second network-connected platforms.

19. The system of claim 13, wherein the first network-connected platform permits managers to communicate with company representatives and workers but prohibits the workers from communicating with the company representatives unless those communications are approved or initiated by the company representatives.

20. The system of claim 13, wherein the second network-connected platform permits company representatives to communicate with managers and workers.

21. The system of claim 13, wherein the computer network through which the first and second network-connected platforms are connected to one another is the Internet.

22. The system of claim 13, wherein the second network-connected platform is accessible to a partner of the company that outsources work on behalf of the company.

* * * * *